United States Patent
Kaiser et al.

(10) Patent No.: US 10,439,258 B2
(45) Date of Patent: Oct. 8, 2019

(54) ENERGY STORAGE UNIT HAVING A PLURALITY OF GALVANIC CELLS, BATTERY CELL FOR AN ENERGY STORAGE UNIT OF THIS KIND, AND METHOD FOR PRODUCING THE BATTERY CELL

(71) Applicant: Robert Bosch GmbH, Stuttgart (DE)

(72) Inventors: Rudi Kaiser, Bamberg (DE); Silvan Poller, Neisseaue ot Kaltwasser (DE); Holger Reinshagen, Bamberg (DE); Jens Boehme, Gerlingen (DE); Joachim Fetzer, Bad-Ditzenbach (DE); Martin Gerlach, Strullendorf (DE); Michael Austen, Bamberg (DE); Sarmimala Hore, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 150 days.

(21) Appl. No.: 15/124,061

(22) PCT Filed: Feb. 10, 2015

(86) PCT No.: PCT/EP2015/052722
§ 371 (c)(1),
(2) Date: Sep. 7, 2016

(87) PCT Pub. No.: WO2015/132050
PCT Pub. Date: Sep. 11, 2015

(65) Prior Publication Data
US 2017/0025720 A1    Jan. 26, 2017

(30) Foreign Application Priority Data
Mar. 7, 2014 (DE) .................. 10 2014 204 245

(51) Int. Cl.
*H01M 10/0525* (2010.01)
*H01M 10/42* (2006.01)
(Continued)

(52) U.S. Cl.
CPC ......... *H01M 10/486* (2013.01); *H01M 2/027* (2013.01); *H01M 2/1077* (2013.01);
(Continued)

(58) Field of Classification Search
CPC .. H01M 10/486; H01M 2/348; H01M 10/659; H01M 2/1094; H01M 10/0525;
(Continued)

(56) References Cited

U.S. PATENT DOCUMENTS 5,346,786 A    9/1994 Hodgetts
8,372,536 B2   2/2013 Han et al.
(Continued)

FOREIGN PATENT DOCUMENTS

DE    102009031127    1/2011
DE    102009037850    2/2011
(Continued)

OTHER PUBLICATIONS

International Search Report for Application No. PCT/EP2015/052722 dated Apr. 28, 2015 (English Translation 3 pages).

*Primary Examiner* — Muhammad S Siddiquee
(74) *Attorney, Agent, or Firm* — Michael Best & Friedrich LLP

(57) ABSTRACT

The present invention relates to an energy storage unit (1) having a plurality of electrochemical cells (2), wherein the electrochemical cells (2) each have a first outer face (3) comprising a first electrode (5), and a second outer face (4) comprising a second electrode (6), and the electrochemical cells (2) are electrically interconnected owing to the lined-up arrangement (9) of the electrochemical cells (2) by way of
(Continued)

the outer faces (3, 4) by means of the electrodes (5, 6). The energy storage unit (1) additionally comprises a first frame element (7) and a second frame element (8), which frame elements are directly or indirectly connected to one another, wherein the first frame element (7) is arranged at one end (10) of the lined-up arrangement (9) of the electrochemical cells (2), and the second frame element (8) is arranged at the other end (11) of the lined-up arrangement (9) of the electrochemical cells (2). The present invention also relates to a battery cell (2) for use with an energy storage unit (1) according to the invention, and also to a method for producing a battery cell (2) of this kind.

24 Claims, 11 Drawing Sheets

(51) Int. Cl.

| | | |
|---|---|---|
| *H01M 10/48* | (2006.01) | |
| *H01M 2/02* | (2006.01) | |
| *H01M 2/10* | (2006.01) | |
| *H01M 10/04* | (2006.01) | |
| *H01M 10/60* | (2014.01) | |
| *H01M 10/659* | (2014.01) | |
| *H01M 2/34* | (2006.01) | |

(52) U.S. Cl.
CPC ......... *H01M 2/1094* (2013.01); *H01M 2/348* (2013.01); *H01M 10/0418* (2013.01); *H01M 10/0486* (2013.01); *H01M 10/0525* (2013.01); *H01M 10/425* (2013.01); *H01M 10/60* (2015.04); *H01M 10/659* (2015.04); *H01M 2010/4271* (2013.01); *H01M 2200/103* (2013.01); *H01M 2220/20* (2013.01)

(58) Field of Classification Search
CPC .... H01M 10/425; H01M 2/027; H01M 10/60; H01M 10/0486; H01M 10/0418; H01M 2/1077; H01M 2220/20; H01M 2200/103; H01M 2010/4271
See application file for complete search history.

(56) References Cited

U.S. PATENT DOCUMENTS

| | | | |
|---|---|---|---|
| 2010/0273044 A1* | 10/2010 | Culver | H01M 2/24 429/160 |
| 2011/0008670 A1* | 1/2011 | Han | H01M 2/0277 429/163 |
| 2012/0156537 A1 | 6/2012 | Meintschel et al. | |
| 2012/0189887 A1 | 7/2012 | Hohenthanner et al. | |
| 2014/0057145 A1* | 2/2014 | Goldstein | H01M 2/0207 429/71 |
| 2014/0113171 A1* | 4/2014 | Schaefer | H01M 2/1077 429/120 |
| 2014/0220409 A1 | 8/2014 | Hohenthanner et al. | |
| 2014/0227576 A1* | 8/2014 | Meintschel | H01M 2/024 429/120 |
| 2015/0037626 A1* | 2/2015 | Malcolm | H01M 2/206 429/53 |
| 2017/0069940 A1* | 3/2017 | Goldstein | H01M 2/24 |

FOREIGN PATENT DOCUMENTS

| | | |
|---|---|---|
| DE | 102010032414 | 2/2012 |
| DE | 102011109203 | 2/2013 |
| DE | 102011109218 | 2/2013 |
| DE | 102011120511 | 6/2013 |
| DE | 102012221680 | 5/2014 |
| EP | 2413414 | 2/2012 |
| EP | 2605301 | 6/2013 |
| WO | 2013083213 | 6/2013 |

\* cited by examiner

ENERGY STORAGE UNIT HAVING A PLURALITY OF GALVANIC CELLS, BATTERY CELL FOR AN ENERGY STORAGE UNIT OF THIS KIND, AND METHOD FOR PRODUCING THE BATTERY CELL

BACKGROUND OF THE INVENTION

The invention relates to an energy storage unit, in particular a battery module, having a plurality of galvanic cells, in particular of battery cells, wherein the galvanic cells in each case have a first outer side comprising a first electrode and a second outer side comprising a second electrode and the galvanic cells are electrically interconnected with one another by juxtaposition of the galvanic cells by way of the outer sides via the electrodes. Consequently, the invention generally relates to the interconnection of galvanic cells, in particular of battery cells, to form a multi-cell energy store.

Furthermore, the invention relates to a battery cell for use with an energy storage unit of this kind, and to a method for producing a battery cell of this kind.

Such energy storage units and battery cells are usable in particular as mobile energy storage units or energy storage units used in a stationary fashion.

In order to be able to provide energy storage units which are designed to supply high voltages and/or high currents, it is known for a plurality of individual cells to be electrically interconnected in series or electrically interconnected in parallel to form an energy storage unit. For interconnecting a plurality of individual cells to form an energy storage unit, different techniques are known in the prior art, wherein these different interconnection techniques occasionally require different designs of the galvanic cells to be interconnected.

By way of example, so-called pouch cells, for the electrical contacting, usually have thin metal strips or metal foils as so-called "contact lugs". Such pouch cells are known in the prior art for example from the document DE 10 2010 032 414 A1 or the document EP 2 413 414 A3. In this case, a series or parallel connection of such pouch cells is usually produced by contacting the contact lugs by means of soldering, screw or crimp connections, as disclosed for example in the document EP 2 605 301 A2.

Prismatic battery cells surrounded by a so-called hard case usually have so-called cell terminals for the electrical contacting, said cell terminals projecting from the hard case. Said cell terminals are usually electrically connected to one another for the interconnection of a plurality of such prismatic cells by means of so-called cell connectors by screw or welding connection.

The document U.S. Pat. No. 8,372,536 B2 and the document DE 10 2012 221 680, not yet published on the filing date of this invention, additionally disclose battery cells having a metal housing, wherein a part of the metal housing is designed as a cell terminal of the battery cell, such that battery cells designed in this way are electrically contactable with one another by juxtaposition.

Alongside the interconnection of galvanic cells to form an energy storage unit, a further challenge is to provide safety measures in order to be able to ensure safe operation of the energy storage unit. One safety measure, which additionally counteracts premature aging of the galvanic cells, is to regulate the temperature of the galvanic cells of an energy storage unit. For this purpose, a cooling plate through which coolant flows and on which the galvanic cells are arranged is usually used as a cooling device. Disadvantageously, such a cooling plate results in an increase in weight, which is undesired particularly in automotive engineering.

As further safety measures, the document EP 2 605 301 A2 discloses, for example, so-called thermal safety barriers that are used between galvanic cells arranged alongside one another. Said safety barriers, in the case of so-called thermal runaway of a galvanic cell, are intended to prevent the thermal runaway from being transmitted to adjacent galvanic cells and thus resulting in a chain reaction that destroys a multiplicity of galvanic cells as a consequence.

Against this background it is an object of the invention to improve an energy storage unit, in particular a battery module, having a plurality of galvanic cells, in particular battery cells, in particular to the effect that the weight of the energy storage unit is reduced, particularly with regard to the ratio of "passive mass" (cell connectors, cell housings, safety devices, etc.) to "active mass" (cathode material, anode material, solvents, etc.). Furthermore, in particular the number of components of the energy storage unit is intended to be reduced, and thus the production of an energy storage unit is intended to become advantageously more cost-effective.

In addition, the number of manufacturing steps required for producing an energy storage unit is advantageously intended to be reduced.

SUMMARY OF THE INVENTION

In order to achieve the object, an energy storage unit, in particular a battery module, having a plurality of galvanic cells, in particular of battery cells, is proposed, wherein the galvanic cells in each case have a first outer side comprising a first electrode and a second outer side comprising a second electrode and the galvanic cells are electrically interconnected with one another by juxtaposition of the galvanic cells by way of the outer sides via the electrodes, and wherein the energy storage unit comprises a first frame element and a second frame element, which are connected to one another, in particular are directly or indirectly connected to one another, wherein the first frame element is arranged at one end of the juxtaposition of the galvanic cells and the second frame element is arranged at the other end of the juxtaposition of the galvanic cells. In particular, it is provided that the first frame element and the second frame element are releasably connected to one another, in particular via a plug connection and/or a latching connection. In this case, the frame elements advantageously fix the galvanic cells. Furthermore, the position of the galvanic cells is advantageously determined by the frame elements. The first frame element and the second frame element thus advantageously form as it were module end plates. In particular, it is provided that the arrangement of the battery cells is electrically contactable via the first frame element and/or the second frame element. For this purpose, the first frame element and/or the second frame element advantageously comprise(s) a contacting element, in particular a terminal, preferably a plug contact.

The quantifiers, in particular "first" and "second", used in association with the frame elements serve exclusively to differentiate the frame elements, without defining here an order of the arrangement of the frame elements.

In particular, the invention is directed to an energy storage unit that is usable in hybrid, plug-in hybrid or electric vehicles as an energy source for providing the electrical energy required for the operation of such a vehicle.

In particular, it is furthermore provided that the galvanic cells are secondary battery cells, that is to say rechargeable battery cells, particularly preferably rechargeable lithium-ion cells. Preferably, the galvanic cells are configured in a parallelepipedal fashion. In particular, galvanic cells are provided which have a length of between 5 cm and 50 cm (cm: centimeter), preferably a length of between 10 cm and 30 cm. In this case, the cells preferably have a width smaller than their length. The thickness of said cells may be in particular between 0.5 cm and 10 cm; however, cells having a thickness of 30 cm, for example, may also be provided. In this case, the dimensions of the cell are determined in particular by the type of galvanic cell.

In accordance with one advantageous configurational variant of the energy storage unit according to the invention, it is provided that the first frame element and/or the second frame element in each case completely frame(s) at least one galvanic cell. If the energy storage unit according to the invention comprises as frame elements exclusively the first frame element and the second frame element, then it is provided in particular that the first frame element and the second frame element completely enclose the galvanic cells, that is to say that a plurality of galvanic cells may advantageously be inserted into the first frame element and/or the second frame element. In this case, therefore, a plurality of galvanic cells may be inserted in a frame element, wherein the first frame element and the second frame element are advantageously joined together after the galvanic cells have been arranged into the frame elements.

In accordance with one particularly preferred configuration of the invention, it is provided that at least one third frame element which at least partly frames at least one galvanic cell of the energy storage unit is arranged between the first frame element and the second frame element, wherein advantageously the first frame element is connected to the second frame element via the at least one third frame element. In particular, it is provided that a third frame element of the energy storage unit has in each case a thickness which allows exactly one of the galvanic cells of the energy storage unit to be framed. Preferably, two galvanic cells arranged on one another are respectively half framed in each case by a third frame element of the energy storage unit, in particular in such a way that the mutually contacting outer sides of the galvanic cells are completely enclosed by the frame element. In particular, it is provided that the energy storage unit according to the invention has a plurality of third frame elements, wherein the latter preferably have the same geometry. In this case, the third frame elements of the energy storage unit may advantageously have different further functionalities that in particular go beyond fixing and/or stabilizing the juxtaposition of the galvanic cells. A high variability with regard to the number of galvanic cells to be interconnected is advantageously provided by the frame elements.

A further particularly advantageous configuration of the energy storage unit according to the invention provides for the at least one third frame element to be arranged in each case between identically sized groups of electrically interconnected galvanic cells of the energy storage unit. In this case, identically sized groups of electrically interconnected galvanic cells comprise the same number of electrically interconnected galvanic cells. In this case, as an advantageous configuration, in particular the case that a group comprises only a single galvanic cell is also provided. In particular, it is provided that the at least one third frame element is designed in such a way that in each case the number of galvanic cells which belong to a group is framed by the third frame element. In particular, in accordance with one particularly advantageous configuration of the invention, it is provided that the first frame element and the at least one third frame element are in each case designed to completely frame a respective galvanic cell to the extent of half thereof. In this case, it is provided that, beginning with the first frame element, firstly a galvanic cell is arranged in the first frame element, then a third frame element is connected to the first frame element, wherein the second half of the first galvanic cell is framed by said third frame element, then half of a further galvanic cell is introduced into said third frame element, and then in turn a third frame element is arranged on the previous third frame element, wherein once again two galvanic cells are in each case half framed by said frame element. This advantageously continues until all the galvanic cells are electrically interconnected with one another in this way. Finally, the second frame element is attached to the last third frame element, wherein the second frame element fixes in particular the last galvanic cell. Advantageously, a further housing into which the energy storage unit is introduced is not necessary here. Advantageously, the frame elements here fulfill a sealing function and advantageously prevent the galvanic cells from coming into contact with moisture. Since the frame elements thus advantageously fulfill a housing substitute function and a fixing function and, advantageously, no cell connectors are necessary, the weight of the energy storage unit according to the invention is advantageously reduced.

In particular, it is provided that the frame elements are composed of an electrically nonconductive plastic. Preferably, the frame elements are produced as an injection-molded part, which advantageously contributes to a cost-effective production of the energy storage unit according to the invention.

In accordance with a further advantageous configuration of the energy storage unit according to the invention, it is provided that the frame elements in each case have at least one fixing element, wherein adjacent frame elements are connected to one another in each case via the at least one fixing element. Preferably latching hooks and corresponding receptacles for said latching hooks are provided as fixing elements. Other plug elements are likewise provided as preferred fixing elements, since this advantageously facilitates the construction of an energy storage unit according to the invention, as a result of which the production costs are advantageously reduced. The fixing elements advantageously enable the frame elements to be releasably connected, as a result of which a defective galvanic cell can advantageously be exchanged in a simple manner. If exchange of individual cells is not necessary and/or not desired and/or increased pretensioning forces become necessary, in accordance with a further advantageous configuration of the invention an additional outer bracing is provided, in particular by means of a tensioning belt and/or by means of a cable tie and/or by means of an adhesive tape, preferably by means of a glass fiber reinforced adhesive tape, wherein the outer bracing is advantageously arranged around the frame elements.

In accordance with a further advantageous configuration of the invention, the first frame element and/or the second frame element and/or the at least one third frame element in each case have/has at least one contacting element, wherein the at least one contacting element contacts at least one galvanic cell of the energy storage unit for detecting at least one parameter of the galvanic cell. As a result, the construction of the energy storage unit according to the invention is advantageously simplified further. In particular, it is provided here via the frame elements, owing to their shape and the appropriately corresponding shaping of the galvanic cells, by virtue of the arrangement of the galvanic cell in the respective frame element, the galvanic cell is contacted in such a way that at least one parameter of the galvanic cell, in particular a cell voltage and/or a cell current and/or a cell temperature, can be detected by means of the at least one contacting element. In accordance with one advantageous development, the at least one contacting element comprises at least one sensor for detecting at least one cell parameter.

Advantageously, the first frame element and/or the second frame element and/or the at least one third frame element in each case have/has at least one connection element which is electrically conductively connected to the at least one contacting element, wherein the at least one connection element is connected to a cell monitoring unit and/or is connectable to a cell monitoring unit. As a result, the construction of an energy storage unit according to the invention is advantageously simplified further. Moreover, corresponding lines for detecting cell parameters are advantageously obviated, as a result of which the weight of an energy storage unit according to the invention is advantageously reduced further compared with conventional energy storage units. In this case, a cell monitoring unit may be, in particular, a so-called cell supervising circuit (CSC). In this case, the cell monitoring unit may be arranged in particular as an application specific integrated circuit (ASIC) on the frame elements, preferably as part of a printed circuit board. Instead of a printed circuit board, in particular it is also possible to use a ribbon cable or conductor tracks applied to a carrier film including bonding positions.

In accordance with a further advantageous configuration of the energy storage unit according to the invention, the first frame element and/or the second frame element and/or the at least one third frame element of the energy storage unit comprise(s) a cell monitoring unit. In particular, it is provided that the first frame element and/or the second frame element comprise(s) a cell monitoring unit, wherein the cell monitoring unit is advantageously applied to a circuit board. Advantageously, the first frame element and/or the second frame element have/has in each case an insert into which the circuit board having the cell monitoring unit is inserted. Furthermore, as an advantageous configurational variant it is provided, in particular, that the cell monitoring unit is introduced as an injection-molded part during the production of the frame element. In particular, as an advantageous configuration it is provided that a contacting of the connection elements is effected during the process of arranging the frame elements, in particular in such a way that parameters of the galvanic cells can be transmitted via the frame elements from the at least one cell monitoring unit. As a result, advantageously, the interconnection outlay is reduced further and the production costs for an energy storage unit according to the invention are decreased further.

A further particularly advantageous configuration of the energy storage unit according to the invention provides for the first frame element and/or the second frame element and/or the at least one third frame element to be designed in each case as a cooling device for regulating the temperature of at least one galvanic cell of the energy storage unit. In particular, it is provided here that the frame element comprises at least one cooling channel, which is advantageously designed in such a way that a coolant for regulating the temperature of the at least one galvanic cell can flow through said at least one cooling channel. Advantageously, the frame elements in this case comprise a coolant feed connection and/or a coolant discharge connection, such that a coolant can circulate through the frame elements for regulating the temperature of the galvanic cells. A further advantageous configuration provides for the first frame element and/or the second frame element and/or the at least one third frame element to have an electrical heating filament as a cooling device for regulating the temperature of at least one galvanic cell of the energy storage unit. The cooling device is then a heating device. Such a configuration is advantageous, in particular, if the galvanic cells are intended to be temperature regulated to the optimum operating temperature at low ambient temperatures, wherein the galvanic cells can be heated by means of the heating filament.

In accordance with a further advantageous configuration of the energy storage unit according to the invention, the first frame element and/or the second frame element and/or the at least one third frame element in each case comprise(s) at least one bearing element which projects into the area spanned by the frame element and on which at least one galvanic cell of the energy storage unit bears by way of a bearing region of the galvanic cell. In this case, it is provided, in particular, that the bearing element is arranged centrally in the respective frame element, such that the frame element advantageously in each case encloses half a battery cell. The first frame element and/or the second frame element advantageously have/has an area closed toward one side. In this case, said area forms the bearing element. In the case of the third frame elements, the bearing elements preferably only partly project into the areas spanned by the frame element, in order to further simplify a contacting of the galvanic cells via the outer side thereof without intermediate elements and thus with lower weight.

A further advantageous configuration of the invention provides for the energy storage unit to comprise at least one safety barrier which is arranged between two adjacently arranged galvanic cells of the energy storage unit, wherein the safety barrier provides an electrically conductive connection between said galvanic cells and is designed to prevent a thermal chain reaction between said galvanic cells. In this case, it is provided, in particular, that the safety barrier comprises on the outer sides thereof in each case a contacting area, which are electrically connected to one another via at least one electrically conductive connecting element, such that the battery cells spaced apart by said safety barrier are electrically contacted via said contacting areas. A filling material having poor or only low thermal conductivity is advantageously introduced between the contacting areas. Advantageously, the filling material is additionally designed as a temperature absorber, preferably via phase change materials (pcm). The electrical connection may advantageously be effected by the filling material and/or around the filling material, in particular as a metallic lining of the safety barrier or as a metallic outer surface of the safety barrier. In accordance with a further advantageous configuration, the at least one electrically conductive connecting element is designed as a current interrupt device (CID), in particular as a wire fusible link.

In particular, it is provided that the at least one safety barrier is furthermore designed as a cooling device for regulating the temperature of the galvanic cells surrounding the safety barrier. For this purpose, the safety barrier preferably comprises at least one cooling channel through which a coolant can be conducted. Moreover, in accordance with one advantageous development, it is provided that the safety barrier comprises an electrical heating filament for regulating the temperature of the galvanic cells surrounding the safety barrier.

Advantageously, the at least one third frame element is designed as the safety barrier. As a result, the functionality of the at least one third frame element is advantageously increased further. In particular, it is provided that at least some of the third frame elements of an energy storage unit according to the invention are designed as a safety barrier, such that a safety barrier is arranged for example in each case between four galvanic cells, as a result of which the safety of the energy storage unit according to the invention is advantageously increased further. The safety barrier advantageously prevents a chain reaction in the case of a thermal runaway of one of the galvanic cells of the energy storage unit.

In accordance with a further advantageous configuration of the invention, the galvanic cells provided are battery cells, in particular battery cells having the features in accordance with one of the configurations mentioned below.

In order to achieve the object mentioned initially, a battery cell for use with an energy storage unit according to the invention is furthermore proposed, wherein the battery cell has at least one electrode arrangement having at least one cathode and at least one anode, said at least one electrode arrangement being surrounded by a first half-shell and by a second half-shell, wherein the first half-shell and the second half-shell are connected via a linking region and the first half-shell comprises the first electrode of the battery cell and the second half-shell comprises the second electrode of the battery cell. Such a battery cell is distinguished by a small number of component parts and a particularly good weight ratio of passive material of the battery cell to active material of the battery cell, since the passive material constitutes only a small proportion by weight of the battery cell according to the invention. In particular, such a battery cell has a particularly high energy density, in particular in the case of a configuration of the battery cell as a lithium-based battery cell, in particular as a lithium-ion cell. Advantageously, the configuration of the battery cell according to the invention enables contacting of a plurality of such battery cells by juxtaposition of the battery cells via their outer sides formed by the half-shells. Particularly preferably, it is provided here that the electrode arrangement is designed as a cell roll (referred to as "jelly roll") or as a cell stack. In particular, it is provided that the battery cell according to the invention is designed in the manner of a pouch cell, wherein, instead of or in addition to an electrically nonconductive outer enclosure surrounding the electrode arrangement, the electrode arrangement is enclosed by the half-shells and the at least one cathode electrode is electrically conductively contacted with the first half-shell and the at least one anode electrode is electrically conductively contacted with the second half-shell.

In particular, it is provided that the first half-shell of the battery cell comprises a first metallic foil, in particular a first metal foil, and the second half-shell of the battery cell comprises a second metallic foil, in particular a second metal foil. In particular, it is provided here that the first half-shell is formed by the first metallic foil and the second half-shell is formed by the second metallic foil. Advantageously, in this case the battery cell is formed in the manner of a pouch cell enclosed by the first half-shell and the second half-shell. Preferably, the first half-shell and the second half-shell in each case have a thickness of about 40 µm and 220 µm (µm: micrometer). In this case, it is provided, in particular, that the first metallic foil is a high-grade steel foil or a copper foil and the second metallic foil is an aluminum foil or a foil composed of an aluminum alloy. In accordance with one advantageous configurational variant, it is provided that the first half-shell is formed by a first metalized foil and the second half-shell is formed by a second metalized foil. In particular, as an advantageous configurational variant, coated metal foils are provided, in particular aluminum-coated high-grade steel foils or a nickel coating.

In accordance with one particularly advantageous configuration of the battery cell according to the invention, the first metallic foil is shaped to form the first half-shell by means of a deep-drawing method, and the second metallic foil is shaped to form the second half-shell by means of a deep-drawing method. In this case, the battery cell is preferably designed in the manner of a pouch cell. Advantageously, the first half-shell and the second half-shell in each case have a circumferential edge designed in the manner of a rebate. As a result, the housing of the battery cell according to the invention, said housing being formed from the half-shells, is advantageously stabilized further despite the small material thickness of the metallic foils. Advantageously, a half-shell or the volume space formed by the half-shell has a depth of between 3 mm and 15 mm (mm: millimeter). In particular, it is provided that the battery cell has a length of between 5 cm and 30 cm. In this case, the width of the battery cells is advantageously smaller than the length of the battery cell.

A further advantageous configuration of the battery cell according to the invention provides for the cathode of the at least one electrode arrangement to be electrically conductively connected to the first half-shell and the anode of the at least one electrode arrangement to be electrically conductively connected to the second half-shell, wherein at least one insulator element is arranged between the first half-shell and the second half-shell in the linking region in such a way that the first half-shell is electrically insulated from the second half-shell. The connection of the cathode to the first half-shell is advantageously effected via an electrically conductive connecting element, wherein the connecting element electrically conductively contacts the inner side and/or the outer side of the first half-shell. The connection of the anode to the second half-shell is advantageously effected via a further electrically conductive connecting element, wherein the further connecting element electrically conductively contacts the inner side and/or the outer side of the second half-shell.

A further advantageous configuration of the battery cell according to the invention provides for the electrode arrangement to be surrounded by an electrically nonconductive inner layer, in particular an electrically nonconductive inner enclosure, to which the first half-shell and the second half-shell are adjacent toward the outside. The half-shells are thereby advantageously insulated from the cell interior.

In accordance with one advantageous development of the battery cell according to the invention, it is provided here that the cathode of the at least one electrode arrangement is electrically conductively connected to the first half-shell via a first electrically conductive connecting element and the anode of the at least one electrode arrangement is electrically conductively connected to the second half-shell via a second electrically conductive connecting element, wherein the first connecting element and the second connecting element are led out from the inner layer and the half-shells of the battery cell and the first connecting element electrically conductively contacts the first half-shell on the outer side thereof and the second connecting element electrically conductively contacts the second half-shell on the outer side thereof.

In accordance with a further advantageous configuration of the invention, the battery cell comprises at least one first electrode arrangement having a cathode and an anode and at least one second electrode arrangement having a cathode and an anode, wherein the cathode of the first electrode arrangement electrically conductively contacts the first half-shell of the battery cell, the anode of the second electrode arrangement electrically conductively contacts the second half-shell of the battery cell and the battery cell comprises in each case between the first electrode arrangement and the second electrode arrangement an electrically conductive separating element which spatially separates the first electrode arrangement from the second electrode arrangement and which is electrically conductively contacted by the anode of the first electrode arrangement and the cathode of the second electrode arrangement. In this case, the separating element is an ionic barrier that prevents ion exchange. By contrast, solvent exchange is advantageously made possible via the separating element. This configuration of the battery cell according to the invention realizes as it were an electrical series connection of the electrode arrangements within the battery cell. Advantageously, a battery cell having a bipolar design is provided as a result. In this case, the separating element is advantageously electrically insulated both from the first half-shell and from the second half-shell, advantageously with at least one insulator element. The ratio of passive material to active material of the battery cell is advantageously improved further by the bipolar design. This advantageously leads to a further reduction of weight particularly when such a battery cell is used in an energy storage unit according to the invention.

A further advantageous configuration of the battery cell according to the invention provides for at least one cooling device, preferably at least one cooling channel, for regulating the temperature of the battery cell to be arranged between the first half-shell and the second half-shell in the linking region. Advantageously, the at least one cooling device is designed such that a coolant can flow through it. In particular, it is provided that, in the case of a battery cell according to the invention having a bipolar design, at least one cooling device for regulating the temperature of the battery cell is arranged between the first half-shell and the second half-shell, preferably on the outer side of the battery cell. Advantageously, a cooling device, in particular a cooling channel, is in each case arranged on the outer side of the battery cell between the first half-shell and a first separating device and between the first separating device and at least one further separating device and between the at least one further separating device and the second half-shell. Advantageously, the cooling devices of a plurality of such battery cells are connectable to one another here, such that a coolant flows through the cooling devices of a plurality of battery cells.

A further advantageous configuration of the battery cell according to the invention provides for the first half-shell and the second half-shell to have in the linking region in each case a border tapering off in a flat fashion, wherein the border of the first half-shell together with the border of the second half-shell are electrically non-conductively connected to one another. In particular, it is provided that the border of the first half-shell is electrically nonconductively adhesively bonded to the border of the second half-shell. Advantageously, the border of the battery cell is designed in this case as an emplacement region for positioning a battery cell in a frame element of an energy storage unit according to the invention. In this case, it is provided, in particular, that a first frame element frames the first half-shell of a battery cell and a second frame element frames the second half-shell of said battery cell, wherein the border is arranged between the frame elements.

One advantageous configurational variant in this respect provides for the first half-shell and the second half-shell to be connected to one another by means of a flanged adhesive connection and/or by means of an adhesive plug connection.

In a further advantageous configuration of the battery cell according to the invention, the cathode is contacted with a first terminal element, wherein the first terminal element penetrates through the first half-shell on the outer side thereof, and wherein the first terminal element is electrically insulated from the first half-shell. In addition or as an alternative thereto it is provided that the anode of a battery cell according to the invention is contacted with a second terminal element, wherein the second terminal element penetrates through the second half-shell on the outer side thereof, and wherein the second terminal element is electrically insulated from the second half-shell. Via the first terminal element and/or the second terminal element, the battery cell here is advantageously electrically contacted in the case of a juxtaposition of a plurality of such battery cells, such that an interconnection of battery cells according to the invention is made possible by juxtaposition. In this configuration, the first half-shell and/or the second half-shell comprise(s) the first electrode and/or the second electrode, respectively, of the battery cell without themselves/itself forming the first electrode and/or the second electrode, respectively.

In order to achieve the object mentioned initially, a method for producing a battery cell according to the invention is furthermore proposed, wherein a first half-shell having a first outer side is shaped from a first metallic foil, a second half-shell having a second outer side and designed in a manner corresponding to the first half-shell is shaped from a second metallic foil in such a way that at least one electrode arrangement having a cathode and an anode, in particular at least one cell roll or one cell stack, can be enclosed by the first half-shell and the second half-shell, the cathode and the anode of an electrode arrangement are electrically conductively contacted in such a way that a contacting of the cathode via the first outer side of the first half-shell is made possible and a contacting of the anode via the second outer side of the second half-shell is made possible, and the first half-shell and the second half-shell are electrically non-conductively connected to one another. Particularly preferably, it is provided here that the first half-shell is shaped from the first metallic foil, in particular from a first metal foil, by means of a deep-drawing method and/or the second half-shell is shaped from the second metallic foil, in particular from a second metal foil, by means of a deep-drawing method. The metallic foil advantageously becomes dimensionally stable as a result of the deformation of the metallic foil. In particular, a high-grade steel foil or a copper foil is provided as the first metallic foil. In particular, an aluminum foil or a foil produced from an aluminum alloy is provided as the second metallic foil. Preferably, the first metallic foil and/or the second metallic foil in each case have/has a material thickness of between 50 μm and 200 μm. In accordance with one advantageous configurational variant, the first metallic foil and/or the second metallic foil are/is in each case a metalized foil.

Advantageously, in the method according to the invention, on the first metallic foil an electrically nonconductive inner layer is arranged and/or an electrically nonconductive outer layer is arranged, in such a way that the inner layer is arranged at least partly on the inner side of the first half-shell and the outer layer is arranged at least partly on the outer side of the first half-shell, and/or on the second metallic foil an electrically nonconductive inner layer is arranged and/or an electrically nonconductive outer layer is arranged, in such a way that the inner layer is arranged at least partly on the inner side of the second half-shell and the outer layer is arranged at least partly on the outer side of the second half-shell. Preferably, the arrangement of the inner layer and/or of the outer layer on the respective metal foil is effected before the shaping of the metal foil to form the half-shell. In order to provide a contacting on the respective outer side of the battery cell, the inner layer and the outer layer are in each case interrupted. In particular, it is provided that the inner layer and the outer layer for this purpose have in each case a perforation.

BRIEF DESCRIPTION OF THE DRAWINGS

Further advantageous details, features and configuration details and also particularly advantageous configurations of the invention are explained more specifically in association with the exemplary embodiments illustrated in the figures, in which.

DETAILED DESCRIPTION

Figure 1:
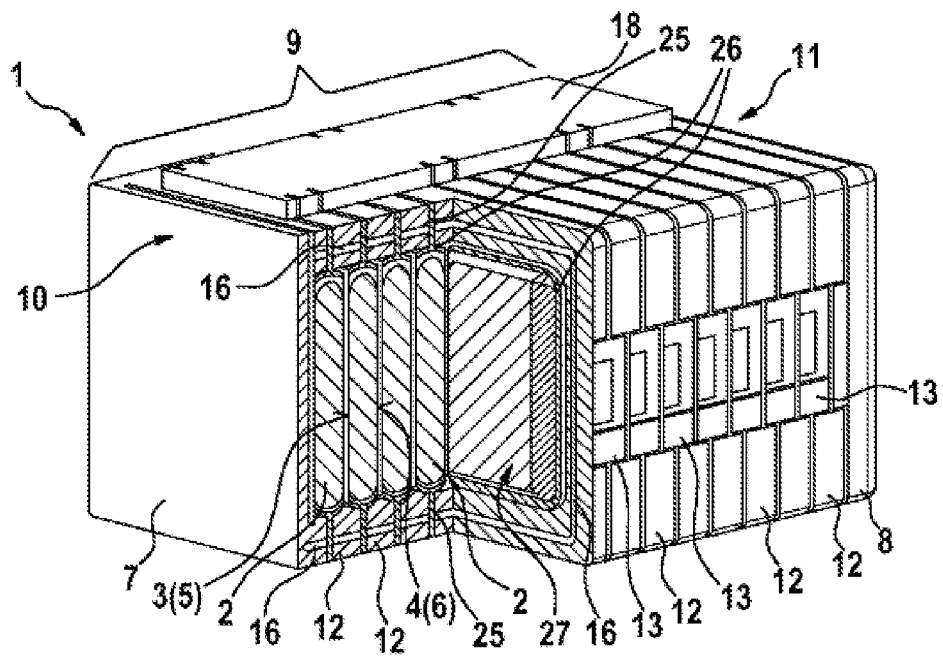
FIG. 1 shows in a schematic illustration a perspective view of one exemplary embodiment of an energy storage unit according to the invention.

The exemplary embodiment illustrated in FIG. 1 shows an energy storage unit 1 according to the invention, said energy storage unit 1 being designed as a battery module in the present case. The energy storage unit 1 here comprises a plurality of galvanic cells 2 designed as secondary battery cells. In particular, it is provided that the galvanic cells 2 are rechargeable lithium-ion cells. In this case, the galvanic cells 2 are designed in such a way that their outer sides 3, 4 respectively comprise the electrodes of the galvanic cell 2, namely the outer side 3 comprising the first electrode, for example the positive electrode, and the second outer side 4 comprising the second electrode 6, for example the negative electrode. In the case of the exemplary embodiment illustrated in FIG. 1, here the first outer side 3 forms the first electrode 5 and the second outer side 4 forms the second electrode 6.

In this case, the galvanic cells 2 of the energy storage unit 1 are electrically interconnected with one another by juxtaposition 9 electrically with one another via the electrodes 5, 6 formed by the outer sides 3, 4. In this case, the galvanic cells 2 are fixed by a plurality of frame elements 7, 8, 12.

In this case, the energy storage unit 1 comprises at an end 10 a first frame element 7, which forms the module end plate of the energy storage unit 1. A first galvanic cell 2 is arranged onto said first frame element 7, wherein the first frame element 7 partly encloses the first galvanic cell 2. In this case, a border 25 of the outer enclosure 26 of the galvanic cell 2 forms an emplacement region with which the respective galvanic cell 2 of the energy storage unit 1 respectively bears on a frame element 7, 8, 12.

In the case of the energy storage unit 1, a third frame element 12 is arranged onto the first frame element 7 with the galvanic cell 2 half arranged therein, wherein said third frame element 12 frames the other half of said galvanic cell 2. Moreover, said third frame element 12 half frames the further galvanic cell 2 juxtaposed against the first galvanic cell 2. In this way, a plurality of third frame elements 12 and further galvanic cells 2 are adjacent to one another, wherein a last galvanic cell 2 at the end 11 of the juxtaposition 9 of the galvanic cells 2 is partly enclosed by a second frame element 8.

The frame elements 7, 8, 12 here are in each case releasably connected to one another via fixing elements 13. Here in particular a latching hook is provided as fixing element 13, said latching hook engaging into a corresponding latch (not illustrated explicitly in FIG. 1). In this way, the first frame element 7 is releasably connected to the second frame element 8 via the further third frame elements 12.

In the exemplary embodiment of an energy storage unit 1 according to the invention as illustrated in FIG. 1, the frame elements 7, 8, 12 are designed as a cooling device for the galvanic cells 2 and for this purpose have in each case a cooling channel 16 through which a coolant can flow.

Moreover, it is provided that the frame elements 7, 8, 12 in each case have contacting elements (not illustrated explicitly in FIG. 1), wherein the contacting elements in each case have a galvanic cell 2 of the energy storage unit 1 for detecting battery cell parameters, in particular battery cell voltages and/or battery cell currents and/or battery cell temperatures. Furthermore, the frame elements 7, 8, 12 in each case have at least one connection element (not illustrated explicitly in FIG. 1), which is electrically conductively connected to the contacting elements. In this case, the connection element of a frame element 7, 8, 12 is electrically conductively connected to a printed circuit board 18 arranged on the frame elements 7, 8, 12. Advantageously, said printed circuit board 18 comprises components of a battery management system, in particular at least one cell monitoring unit (CSC). In particular, it may be provided that a cell monitoring unit is arranged in the first frame element 7 or in the second frame element 8, as also explained below in association with FIG. 2.

Figure 7:
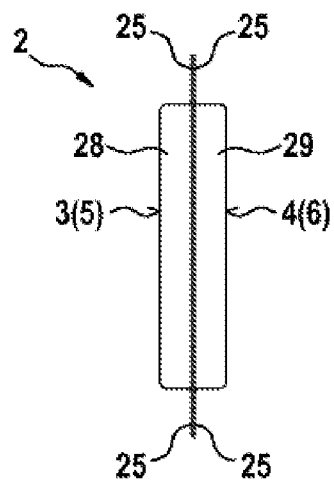
FIG. 7 shows in a schematic illustration a side view of a further exemplary embodiment of a battery cell for use in an energy storage unit according to the invention.

FIG. 7 illustrates one advantageous configuration of a battery cell 2 designed, in particular, to be used in the energy storage unit shown in FIG. 1. In this case, the battery cell 2 comprises two half-shells 28, 29, which are preferably respectively produced from a first metal foil and a second metal foil by means of a deep-drawing method. In this case, high-grade steel, in particular, is provided as the first metal foil, and aluminum, in particular, as the second metal foil. In this case, the outer side 3 of the first half-shell 28 forms the first electrode 5 of the battery cell 2, and the outer side 4 of the second half-shell 29 forms the second electrode 6 of the battery cell 2. The first half-shell 28 and the second half-shell 29 are electrically insulated from one another in this case. The first half-shell 28 and the second half-shell 29 of the battery cell 2 are additionally designed in such a way that the battery cell 2 has a border 25. In this case, the border 25 is designed as a bearing region for arrangement on a frame element 7, 8, 12, as illustrated in FIG. 1 and FIG. 2.

Figure 2:
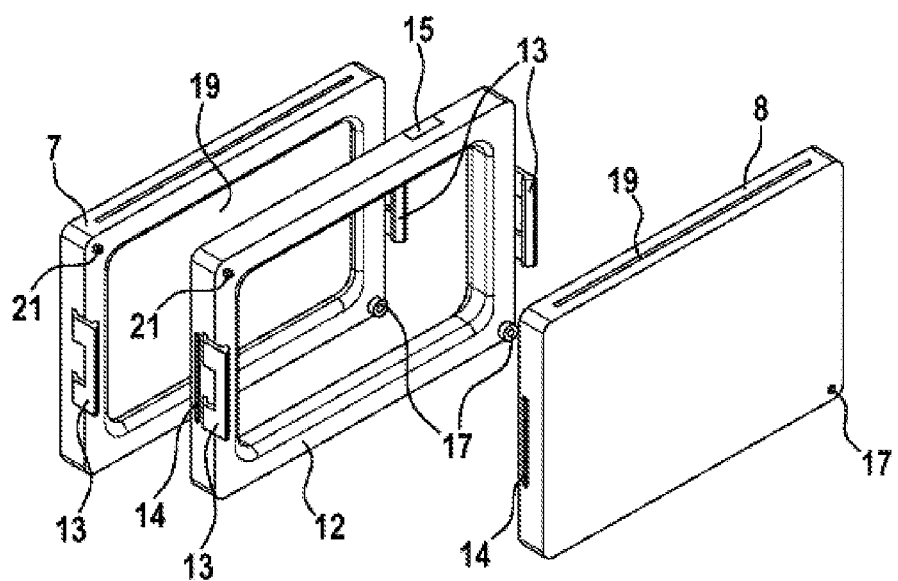
FIG. 2 shows in a schematic illustration a perspective view of one exemplary embodiment of frame elements of an energy storage unit according to the invention.

FIG. 2 illustrates a first frame element 7, a third frame element 12 and a second frame element 8. In this case, the first frame element 7 is designed for arrangement at one end 10 of a juxtaposition 9 of galvanic cells 2, as illustrated in FIG. 1. The second frame element 8 is designed for arrangement at the other end 11 of a juxtaposition 9 of galvanic cells 2, as illustrated in FIG. 1. The first frame element 7 and the second frame element 8 thus serve as it were as module end plates. In this case, the first frame element 7 and the second frame element 8 have a closed area that terminates the receptacle space for at least partly receiving a galvanic cell toward the outside, as illustrated in FIG. 2. Moreover, the first frame element 7 or the second frame element 8 comprises a cell monitoring unit (CSC) 19, which is preferably integrated into a circuit board.

As furthermore illustrated in FIG. 2, the frame elements 7, 8, 12 in each case comprise at least one fixing element 13, 14, 21 via which the frame elements 7, 8, 12 can be releasably connected to one another. In this case, the first frame element 7 and the third frame element 12 in each case have two latching hooks as fixing elements 13, wherein the latching hooks are designed to engage into a corresponding fixing element 14 of a further frame element, said fixing element being designed as a latching depression. The third frame element 12 has in each case both two latching hooks as fixing elements 13 and two latching depressions as fixing elements 14. The second frame element 8 has two latching depressions as fixing elements 14. Moreover, the first frame element 7 and the third frame element 12 in each case have a projection 21, which can engage into a correspondingly designed depression (not illustrated explicitly in FIG. 2) of a further frame element.

The frame elements 7, 8, 12 illustrated in FIG. 2 additionally have in each case a cooling channel (not illustrated explicitly in FIG. 2), wherein the cooling channels can be connected to one another via coolant feed connections 17 of the frame elements 7, 8, 12. In particular, a coolant line system can be connected via the coolant feed connections 17; in particular to the coolant connection 17 of the second frame element 8. Advantageously, the coolant connections 17 of the first frame element 7 and of the third frame elements 12 serve as further fixing elements.

Figure 3:
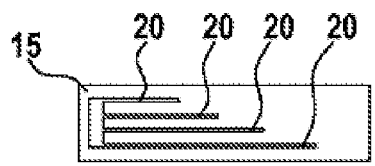
FIG. 3 shows in a schematic, greatly simplified illustration one exemplary embodiment of a connection element with contacting elements of a frame element of an energy storage unit according to the invention.

The third frame element 12 illustrated in FIG. 2 furthermore has at least one contacting element (not illustrated explicitly in FIG. 2), wherein the at least one contacting element is designed for contacting a galvanic cell of an energy storage unit for detecting at least one parameter of the galvanic cell. In this case, the at least one contacting element is electrically conductively connected to a connection element 15 of the third frame element 12, wherein the connection element 15 is connectable, in particular to a cell monitoring unit. FIG. 3 shows in a schematically greatly simplified illustration a connection element 15 with corresponding contacting elements 20 for contacting a galvanic cell 2, wherein parameters of a galvanic cell, in particular cell voltages and/or cell temperatures, may be detected via the contacting elements 20.

Figure 4:
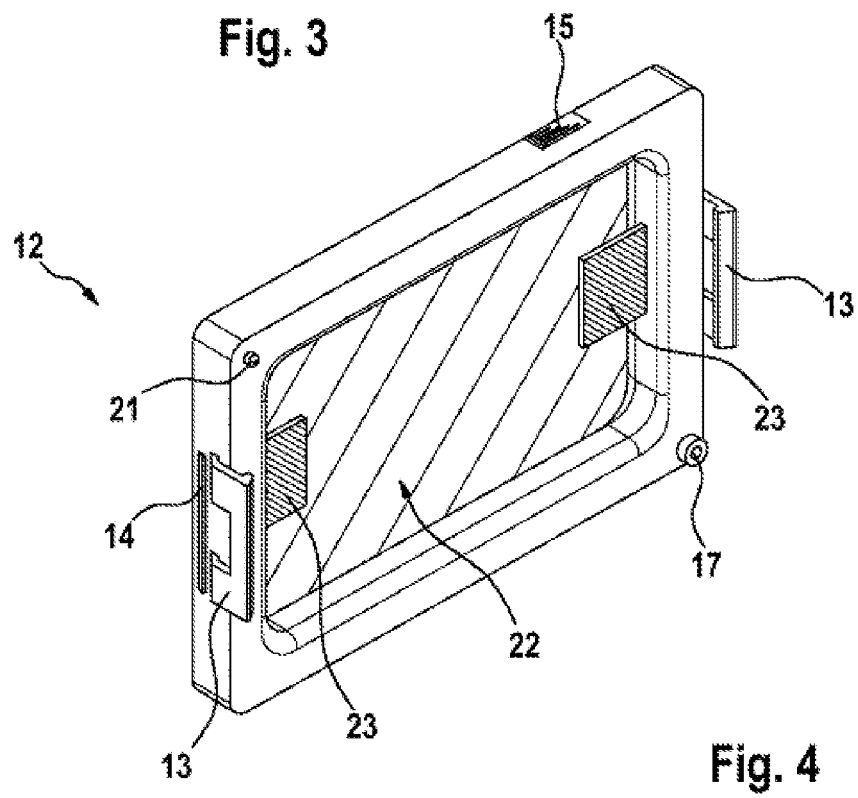
FIG. 4 shows in a schematic illustration a perspective view of a further exemplary embodiment of a frame element of an energy storage unit according to the invention.
Figure 5:
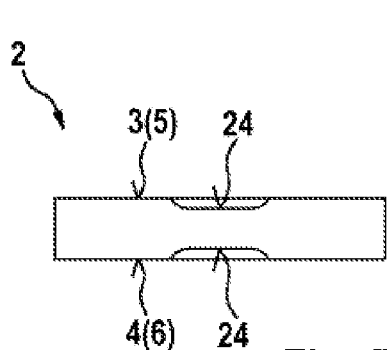
FIG. 5 shows in a schematic illustration a front view of one exemplary embodiment of a battery cell for use in an energy storage unit according to the invention.
Figure 6:
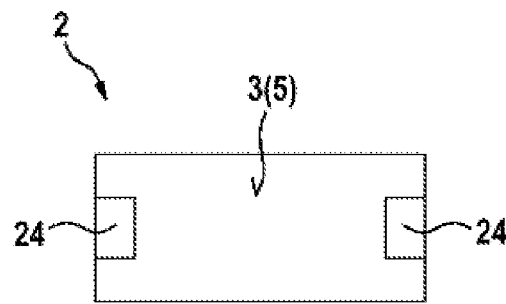
FIG. 6 shows in a schematic illustration a plan view of the battery cell illustrated in FIG. 5.

FIG. 4 shows one advantageous configurational variant of a third frame element 12 for an energy storage unit according to the invention. In a departure from the third frame elements explained in association with FIG. 1 and FIG. 2, the third frame element 12 illustrated in FIG. 4 has two bearing elements 23 projecting into the area 22 spanned by the frame element 12, on which bearing elements the galvanic cells introduced into the frame element 12 during the construction of an energy storage unit according to the invention bear by way of a bearing region of the galvanic cells. One possible configuration of such a galvanic cell 2 is illustrated in FIG. 5 and FIG. 6. In accordance with one advantageous configuration, at least one of the bearing elements 23 is designed in addition or as an alternative to the connection element 15 for a temperature and/or voltage tapping at at least one of the bearing galvanic cells.

In this case, FIG. 5 shows a galvanic cell 2 horizontally in a front view, wherein the bearing regions 24 of the galvanic cell 2 are designed as depressions of the outer sides 3, 4 comprising the electrodes 5, 6 of the galvanic cell 2. FIG. 6 shows the galvanic cell 2 from FIG. 5 in a plan view.

It is provided that the frame element 12 illustrated in FIG. 4 is arranged on a galvanic cell 2 illustrated in FIG. 5 and FIG. 6 in such a way that the bearing elements 23 bear on the bearing regions 24 of the galvanic cell 2. A further galvanic cell 2 of this kind is then introduced into said frame element 12 arranged on the galvanic cell 2, as illustrated in FIG. 5 and FIG. 6, in such a way that the bearing regions 24 of the galvanic cell 2 bear on the bearing elements 23 of the frame element 12. The galvanic cells 2 are electrically interconnected with one another here via the electrodes 5, 6 formed by the outer sides 3, 4 of the galvanic cells 2. With corresponding repetition of this alternating arrangement of galvanic cell 2 and frame element 12, an energy storage unit according to the invention is then constructed, wherein the ends of the energy storage unit are terminated by a first frame element and a second frame element, as explained for example in association with FIG. 2.

Figure 8:
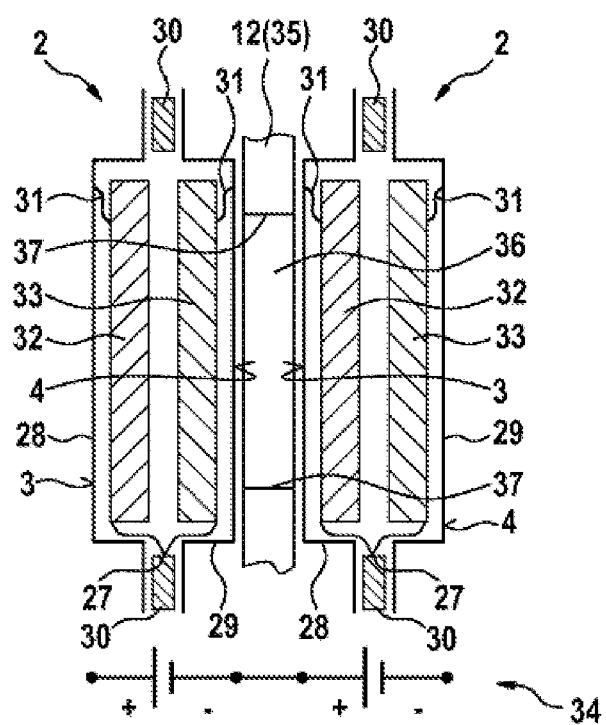
FIG. 8 shows in a schematic illustration one exemplary embodiment of a contacting of battery cells of an energy storage unit according to the invention via a safety barrier.
Figure 9:
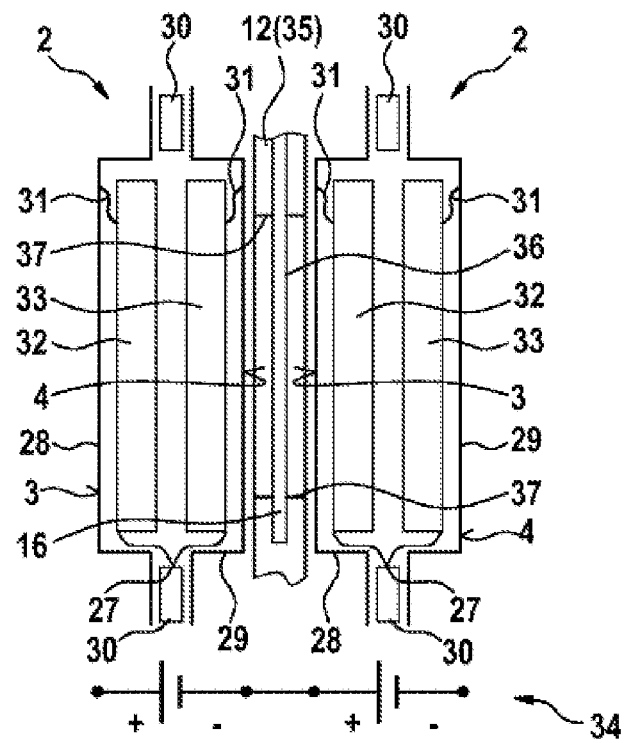
FIG. 9 shows in a schematic illustration a further exemplary embodiment of a contacting of battery cells of an energy storage unit according to the invention via a safety barrier.

FIG. 8 and FIG. 9 respectively show exemplary embodiments of an electrical contacting of battery cells 2 via a safety barrier 35 for interconnecting the battery cells 2 to form an energy storage unit according to the invention. The battery cells 2 here in each case have an electrode arrangement having a cathode 32 and an anode 33. In this case, the cathode 32 and the anode 33 are illustrated by way of example in a greatly simplified manner. In particular, the electrode arrangement 27 in the battery cell 2 is designed as an electrode roll ("jelly roll") or electrode stack. The electrode arrangement 27 here is respectively enclosed by a first electrically conductive half-shell 28 and a second electrically conductive half-shell 29. The cathode 32 here is connected to the respective first half-shell 28 via a first electrically conductive connecting element 31, that is to say an electrical conductor. The anode 33 is connected here to the respective second half-shell 29 via a second electrically conductive connecting element 31', that is to say an electrical conductor. Consequently, the first half-shell 28 forms the first electrode of a battery cell 2 and the second half-shell 29 forms the second electrode of a battery cell 2.

In the exemplary embodiments illustrated in FIG. 8 and FIG. 9, a safety barrier 35 is arranged between the adjacent battery cells 2, said safety barrier advantageously preventing a thermal chain reaction between the battery cells 2 and additionally advantageously preventing, as a mechanical barrier, damage to further battery cells during thermal runaway of a battery cell. Said safety barrier 35 comprises, in particular, a filling material 36 having poor thermal conductivity, which reduces heat exchange between the battery cells 2 to the greatest possible extent. The filling material 36 may also function as a temperature absorber, preferably via phase change materials (pcm). Moreover, the safety barrier 35 provides an electrically conductive connection 37 via which the battery cells 2 are electrically conductively contacted with one another. In this case, in contrast to the illustration shown in FIG. 8 and FIG. 9, the connection 37 need not pass through the safety barrier 35, but rather may also extend circumferentially around the safety barrier 35 on the outer side thereof. Preferably, the electrically conductive connection 37 is effected via a wire fusible link. The battery cells 2 are electrically connected in series via the electrically conductive connection 37, which is clarified by the circuit diagram 34.

In the exemplary embodiment illustrated in FIG. 9, the safety barrier 35 furthermore comprises a cooling channel 16 and is thus furthermore designed as a cooling device for regulating the temperature of the battery cells 2.

In particular, it is provided that a third frame element of an energy storage unit according to the invention, as explained in association with FIG. 1, for example, forms the safety barrier 35 in the exemplary embodiments illustrated in FIG. 8 and FIG. 9, wherein the safety barrier 35 here is advantageously arranged in a centered manner in the frame element.

Figure 10:
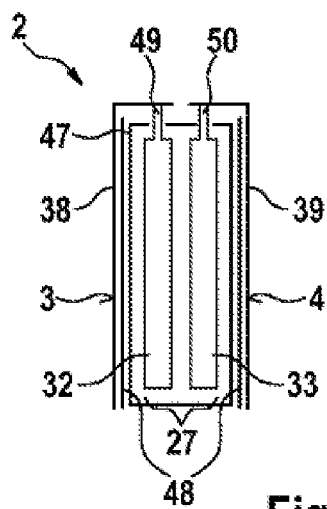
FIG. 10 shows in a schematic illustration a further exemplary embodiment of a battery cell for use in an energy storage unit according to the invention.

FIG. 10 illustrates a further battery cell 2 designed for use with an energy storage unit according to the invention. In this case, the battery cell 2 is designed as a prismatic battery cell. In this case, the battery cell 2 illustrated in FIG. 10 comprises an electrode arrangement 27 having a cathode 32 and an anode 33. In this case, the electrode arrangement 27 is surrounded by a metallic housing 47. The battery cell 2 has a metal foil 38 on an outer side 3, wherein the cathode 32 is electrically conductively contacted with the metal foil 38 via a first cell terminal 49. The metal foil 38 is electrically insulated from the metallic cell housing 47 of the battery cell 2 by means of an insulator element 48. The anode 33 is connected via a second cell terminal 50 to a metal foil 39 arranged on the second outer side 4 of the battery cell 2. The metal foil 39 is electrically insulated from the cell housing 47 by an insulator element 48.

Figure 11:
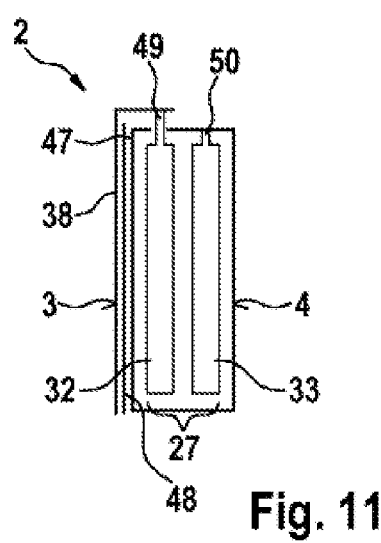
FIG. 11 shows in a schematic illustration a further exemplary embodiment of a battery cell for use in an energy storage unit according to the invention.

FIG. 11 shows one configurational variant of the battery cell 2 illustrated in FIG. 10, wherein the cathode 32, as explained in association with FIG. 10, is contacted with a metal foil 38. The anode 33 is electrically conductively connected directly to the metallic cell housing 47 via the second cell terminal 50. That is to say that the metallic cell housing 47 of the prismatic battery cell 2 forms the second electrode of the battery cell 2. The metal foil 38 and the cell housing 47 thus enable an electrical interconnection of such battery cells 2 via the outer sides 3, 4 thereof by juxtaposition of such battery cells 2.

Figure 12:
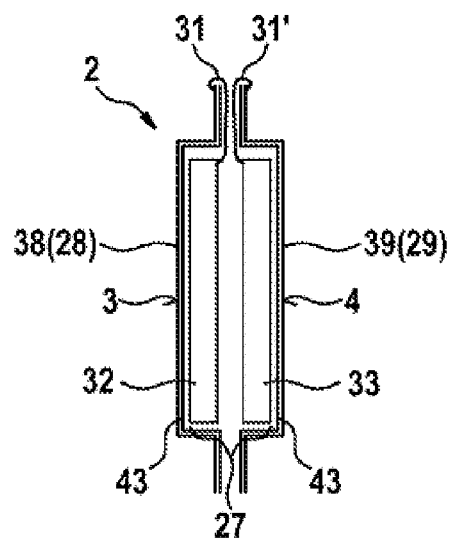
FIG. 12 shows in a schematic illustration a further exemplary embodiment of a battery cell according to the invention for use in an energy storage unit according to the invention.

FIG. 12 shows a further exemplary embodiment of a battery cell 2 designed for use with an energy storage unit according to the invention. This exemplary embodiment of a battery cell 2 according to the invention comprises an electrode arrangement 27 having a cathode 32 and an anode 33. In this case, the cathode 32 and the anode 33 are surrounded, in the manner of a pouch cell, by a housing foil forming an inner layer 43 of the battery cell 2. Moreover, the battery cell 2 comprises a first half-shell 28 and a second half-shell 29. In this case, the first half-shell 28 is formed from a first metallic foil 38 by means of a deep-drawing method. The second half-shell 29 is formed from a second metallic foil 39 by means of a deep-drawing method.

In this case, electrically conductive connecting elements 31 and 31' are led out from the inner layer 43 and the half-shells 28, 29 of the battery cell 2, wherein the first connecting element 31 electrically conductively contacts the cathode 32 with the metallic foil 38 and the second connecting element 31' electrically conductively contacts the anode 33 with the metallic foil 39. In this case, it is provided, in particular, that the first metallic foil 38 is composed of high-grade steel and the second metallic foil 39 is composed of aluminum.

In accordance with one advantageous configurational variant of the battery cell 2, it is provided that the first half-shell 28 is not formed by a metallic foil, but moreover by a metalized housing foil. In this configurational variant, it is likewise provided that the second half-shell 29 is formed by a metalized second housing foil.

Figure 13:
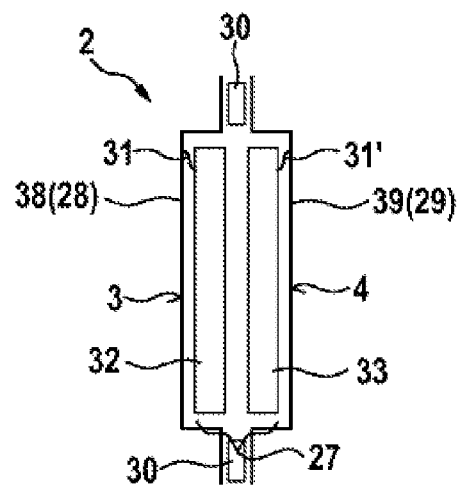
FIG. 13 shows in a schematic illustration a further exemplary embodiment of a battery cell according to the invention for use in an energy storage unit according to the invention.

FIG. 13 illustrates a further advantageous configuration of a battery cell 2 according to the invention. In this case, the battery cell 2 is designed in the manner of a pouch cell, wherein the inner housing foil of a pouch cell is replaced by a first metal foil 38 and a second metal foil 39, which is respectively shaped to form a housing half-shell 28, 29 by means of a deep-drawing method. In this case, the metal foil 38 and the metal foil 39 are electrically insulated from one another by insulator elements 30. The cathode 32 is connected to the first metal foil 38 via an internal contacting realized by means of a first connecting element 31. The anode 33 is electrically conductively contacted with the second metal foil 39 via an internal contacting realized by means of a second connecting element 31'.

In particular, FIG. 13 shows a battery cell 2 for use with an energy storage unit according to the invention, wherein the battery cell 2 has an electrode arrangement 27 having a cathode 32 and an anode 33, said electrode arrangement being surrounded by a first half-shell 28 and by a second half-shell 29. The first half-shell 28 and the second half-shell 29 are connected here via a linking region, into which is introduced an insulator element 30 that electrically insulates the first half-shell 28 from the second half-shell 29. In this case, the first half-shell 28 comprises the first electrode 5 of the battery cell 2, and the second half-shell 29 comprises the second electrode 6 of the battery cell 2. The first half-shell 28 comprises a first metallic foil 38 and the second half-shell 29 comprises a second metallic foil 39. The battery cell 2 is designed in the manner of a pouch cell, wherein the first metallic foil 38 is shaped to form the first half-shell 28 by means of a deep-drawing method, and the second metallic foil 39 is shaped to form the second half-shell 29 by means of a deep-drawing method. The cathode 32 of the electrode arrangement 27 is electrically conductively connected to the first half-shell 28, and the anode 33 of the electrode arrangement 27 is electrically conductively connected to the second half-shell 29.

Figure 16:
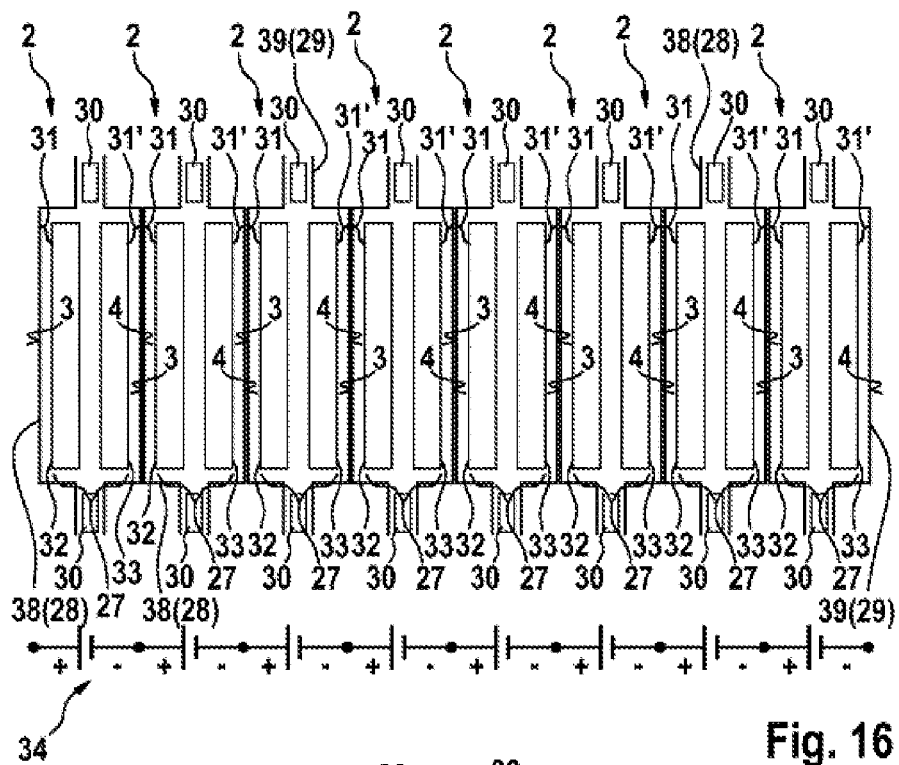
FIG. 16 shows in a schematic illustration one exemplary embodiment of an interconnection of battery cells configured according to the invention.
Figure 17:
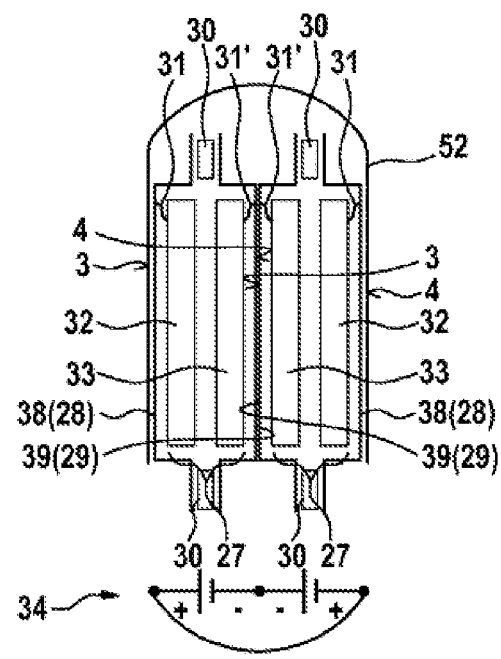
FIG. 17 shows in a schematic illustration a further exemplary embodiment of an interconnection of battery cells configured according to the invention.
Figure 18:
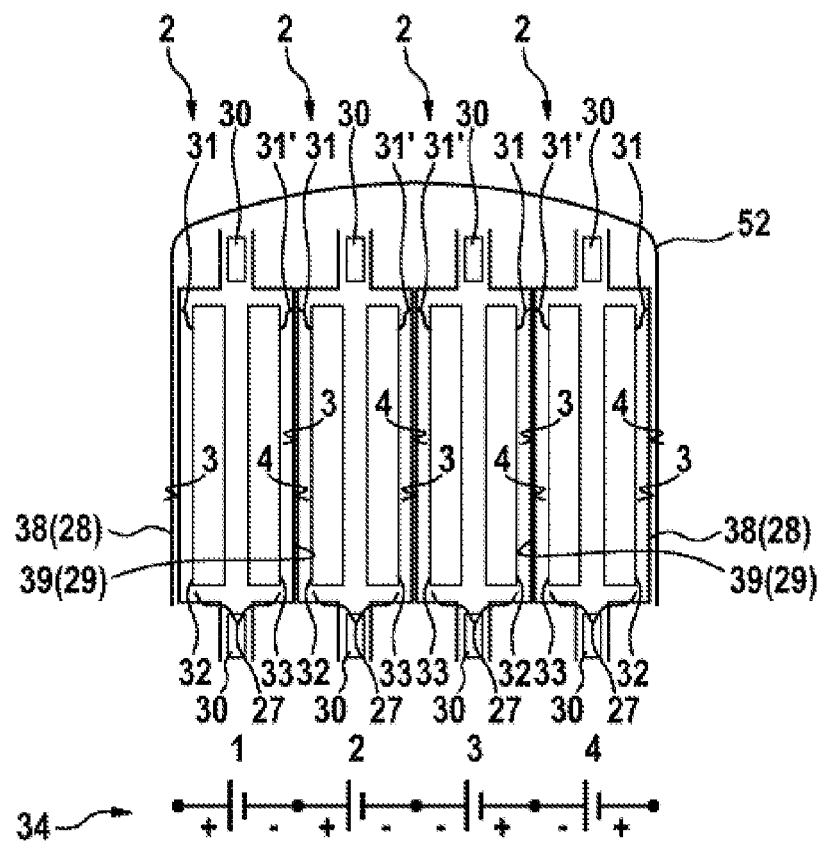
FIG. 18 shows in a schematic illustration a further exemplary embodiment of an interconnection of battery cells configured according to the invention.
Figure 18:
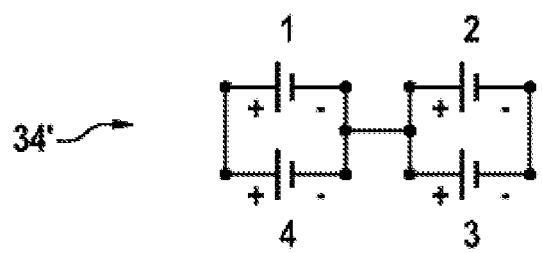

In this case, the configuration of the battery cell 2 enables a plurality of such battery cells 2 to be interconnected by juxtaposition by way of the outer sides 3, 4 thereof, which is illustrated by way of example in FIG. 16, FIG. 17 and FIG. 18.

In FIG. 16, the battery cells 2 here are electrically connected in series by juxtaposition, which is clarified by the circuit diagram 34. Advantageously, no cell connectors are required here for the interconnection of the battery cells 2, which advantageously contributes to a reduction of weight.

In FIG. 17, two battery cells 2 are electrically connected in parallel by the contacting of the half-shells 29 connected to the anode 33, which is clarified by the circuit diagram 34. In this case, the cathodes 32 of the battery cells 2 are electrically conductively connected to one another by means of an electrically conductive contacting element 52, in particular a contacting element 52 designed as a metal foil or as a metal clip. In accordance with one advantageous configurational variant that is not illustrated, the contacting of the cathodes 32 is effected via a high-current printed circuit board that provides the contacting element 52.

Likewise by simple juxtaposition of battery cells 2 and using a contacting element 52, in the exemplary embodiment illustrated in FIG. 18 with four battery cells 2 a series connection of two parallel-connected battery cells 2 is realized, which is clarified by the circuit diagram 34.

Figure 14:
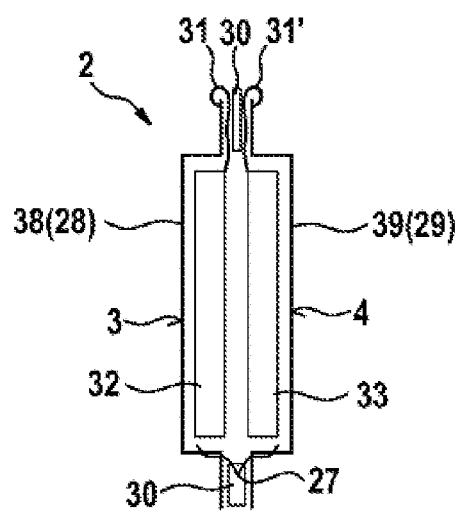
FIG. 14 shows in a schematic illustration a further exemplary embodiment of a battery cell according to the invention for use in an energy storage unit according to the invention.

Such advantageous interconnections can also be realized for example with battery cells 2 designed as illustrated in FIG. 14. In the exemplary embodiment of a battery cell according to the invention as shown in FIG. 14, in contrast to the exemplary embodiment shown in FIG. 13, the connecting elements 31 and 31' are led out from the half-shells 28, 29 and thus as it were from the battery cell 2, such that an external contacting of the first metal foil 38 and of the second metal foil 39 is effected.

Figure 15:
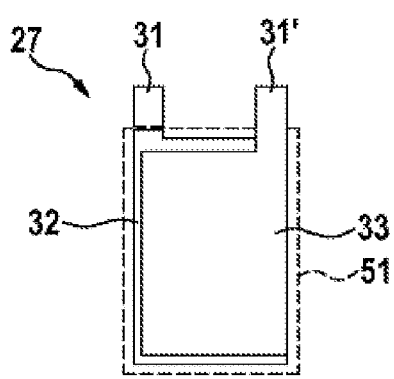
FIG. 15 shows in a schematic illustration one exemplary embodiment of an electrode arrangement of a battery cell according to the invention.

FIG. 15 illustrates one exemplary embodiment of an electrode arrangement 27 having a cathode 32 and an anode 33, which electrode arrangement is to be provided in the battery cells 2 shown. In this case, the cathode 32 is contacted via a first connecting element 31 designed as a contact lug. The anode 33 is contacted via a second connecting element 31' designed as a contact lug. In this case, a separator 51 is arranged between the anode 33 and the cathode 32, said separator not being illustrated explicitly in the other figures, for reasons of better clarity. As already explained, however, in particular electrode rolls ("jelly roll") are also provided as an electrode arrangement of a battery cell according to the invention.

Figure 19:
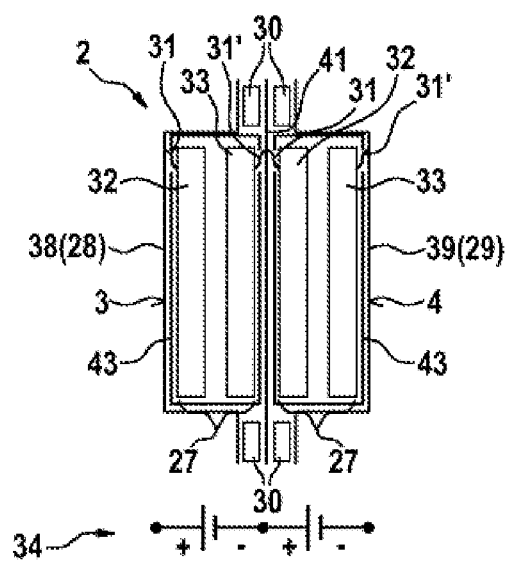
FIG. 19 shows in a schematic illustration a further exemplary embodiment of a battery cell according to the invention for use in an energy storage unit according to the invention.
Figure 20:
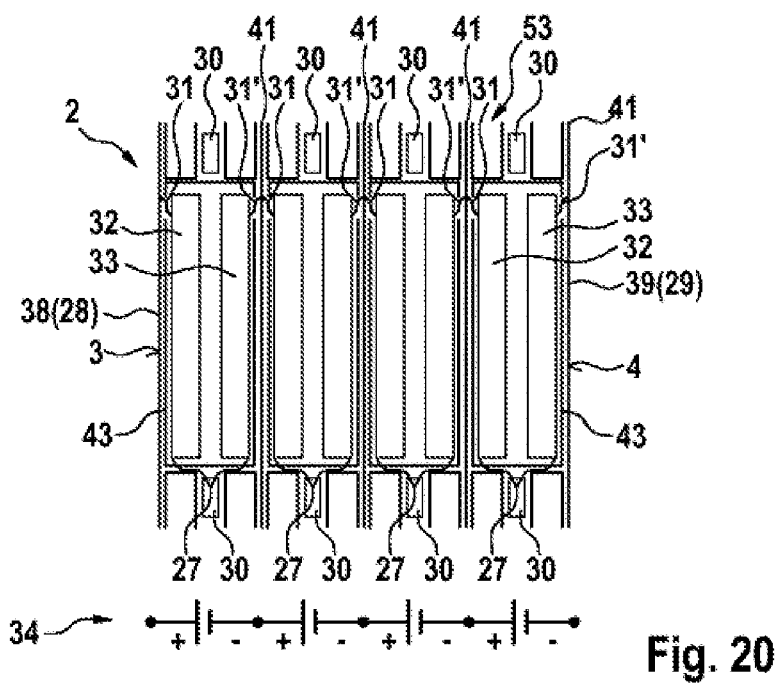
FIG. 20 shows in a schematic illustration a further exemplary embodiment of a battery cell according to the invention for use in an energy storage unit according to the invention.
Figure 21:
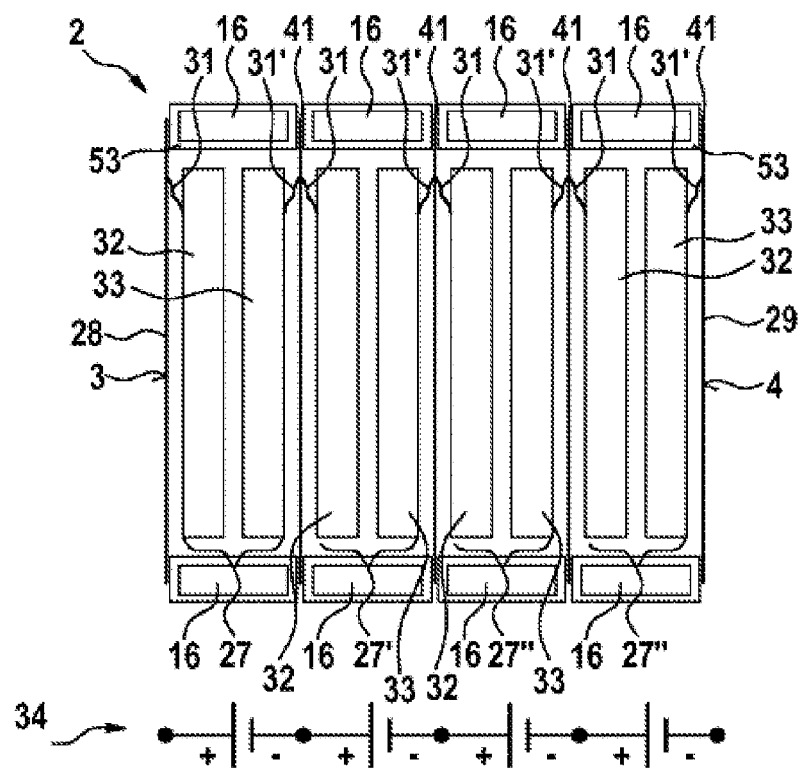
FIG. 21 shows in a schematic illustration a further exemplary embodiment of a battery cell according to the invention for use in an energy storage unit according to the invention.

FIG. 19, FIG. 20 and FIG. 21 show advantageous exemplary embodiments of battery cells 2 according to the invention. The battery cells 2 may be lithium-ion cells, in particular. In particular, the battery cells 2 are designed for use with an energy storage unit according to the invention.

A battery cell 2 respectively shown in FIG. 19, FIG. 20 and FIG. 21 comprises in each case at least one first electrode arrangement 27 having a cathode 32 and an anode 33 and at least one second electrode arrangement 27' having a cathode 32 and an anode 33. In this case, the at least one first electrode arrangement 27 and the at least one second electrode arrangement 27' are enclosed by a first half-shell 28 of the battery cell 2 and by a second half-shell 29 of the battery cell 2. In this case, the first half-shell 28 and the second half-shell 29 are electrically nonconductively connected via a linking region. In this case, at least one insulator element 30 is arranged in the linking region in such a way that the first half-shell 28 is electrically insulated from the second half-shell 29.

The first half-shell 28 here in each case forms the first electrode of the battery cell 2, and the second half-shell 29 the second electrode of the battery cell 2. In this case, the first half-shell 28 is shaped from a first metallic foil 38. The second half-shell 29 is shaped from a second metallic foil 39.

The at least one first electrode arrangement 27 and the at least one second electrode arrangement 27' here are in each case surrounded by an electrically nonconductive inner layer 43, to which the first half-shell 28 and the second half-shell 29 are adjacent toward the outside.

In this case, the cathode 32 of the first electrode arrangement 27 electrically conductively contacts the first half-shell 28 of the battery cell 2. The anode 33 of the second electrode arrangement 27' electrically conductively contacts the second half-shell 29 of the battery cell 2.

The battery cell 2 furthermore comprises at least one separating element 41 which is designed as an ionic barrier and which is arranged in each case between the first electrode arrangement 27 and the second electrode arrangement 27' and spatially separates the first electrode arrangement 27 from the second electrode arrangement 27', but enables solvent exchange in this case. The at least one separating element 41 is in this case electrically conductively contacted by the anode 33 of the first electrode arrangement 27 and the cathode 32 of the second electrode arrangement 27', that is to say that the electrode arrangements are electrically connected in series, which is clarified by the respective circuit diagrams 34. In particular, the separating element 41 may be embodied as bimetal, in particular composed of nickel-aluminum, wherein the anode 33 and the cathode 32 are directly electrically connected. Alternatively, the separating element 41 may in particular also be composed of polyethylene (PE) and/or polypropylene (PP) and/or polyetheretherketone (PEEK), wherein the electrical contact is produced via contact lugs (not illustrated in FIG. 19 to FIG. 21).

In the exemplary embodiment illustrated in FIG. 19, the battery cell 2 here comprises a first electrode arrangement 27 and a second electrode arrangement 27'.

In the exemplary embodiment illustrated in FIG. 20, the battery cell 2 comprises a first electrode arrangement 27, a second electrode arrangement 27', a third electrode arrangement 27" and a fourth electrode arrangement 27'", wherein a separating element 41 is inserted in each case between the electrode arrangements. The separating elements 41 here are advantageously fixed by the cell frames 53.

In the exemplary embodiment of a battery cell 2 according to the invention as illustrated in FIG. 21, said battery cell likewise comprising four electrode arrangements 27, 27', 27", 27'" interconnected with one another, a cooling device having cooling channels 16 for regulating the temperature of the battery cell 2 is arranged between the first half-shell 28 and the second half-shell 29 in the linking region 42. During the operation of the battery cell 2, a coolant in this case advantageously flows through the cooling channels 16. Advantageously, the cooling channels 16 are designed to be connectable to the cooling channels of other battery cells 2. The half-shells 28, 29 may in particular also be designed as plastic frames or cooling frames having lateral separating elements.

Figure 22:
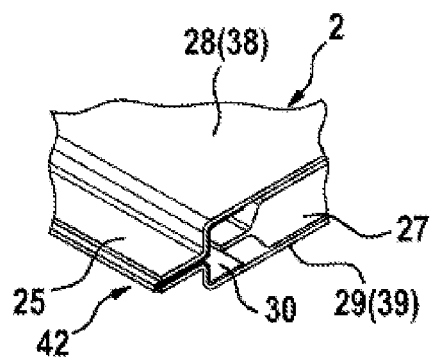
FIG. 22 shows in a schematic illustration a perspectively illustrated excerpt from a further exemplary embodiment of a battery cell according to the invention for use in an energy storage unit according to the invention.

FIG. 22 shows a further advantageous exemplary embodiment of a battery cell 2 configured according to the invention, having a first half-shell 28 composed of a first metal foil 38 and a second half-shell 29 composed of a second metal foil 39. In this case, the first half-shell 28 and the second half-shell 29 are connected via a linking region 42. In the linking region 42 the first half-shell 28 and the second half-shell 29 in each case have a border 25 tapering off in a flat fashion, wherein the border 25 of the first half-shell 28 together with the border 25 of the second half-shell 29 are electrically nonconductively connected to one another. For this purpose, an electrically insulating insulator element 30, preferably an electrically nonconductive adhesive, is introduced between the border 25 of the first half-shell 28 and the border 25 of the second half-shell 29.

Figure 23:
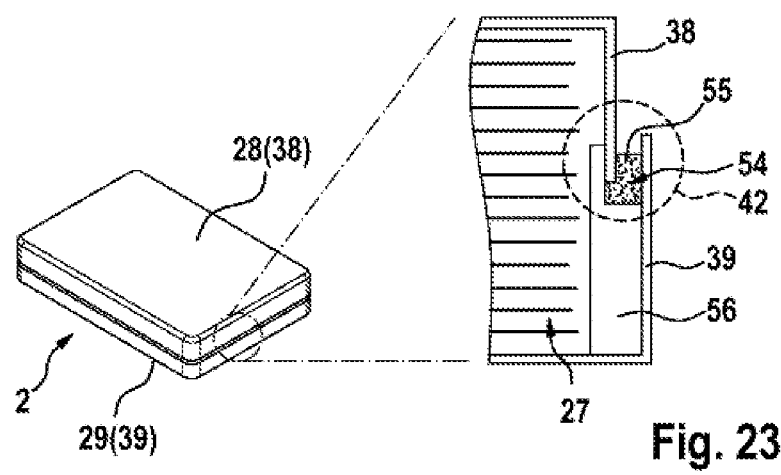
FIG. 23 shows in a schematic illustration a perspective view of a further exemplary embodiment of a battery cell according to the invention for use in an energy storage unit according to the invention with the linking region of the battery cell being highlighted.

In the exemplary embodiment of a battery cell 2 according to the invention as illustrated in FIG. 23, the linking of the half-shells 28, 29 is solved differently. This is illustrated schematically in the enlarged portion shown in FIG. 23. A retainer frame 56, which is preferably composed of polyetheretherketone, together with the second half-shell 29 of the battery cell 2, said second half-shell forming the anode, form a groove 54 into which engages the first half-shell 29 of the battery cell 2, said first half-shell forming the cathode. In this case, a stable connection of the half-shells 28, 29 is produced by means of a connecting material 55 introduced into the groove 54, wherein the connecting means 55 advantageously functions as a compensation element by virtue of an adaptive modulus of elasticity during the operation of the battery cell 2. Furthermore, the connecting material 55 and the retainer frame 56 are preferably electrolyte-stable and constitute a diffusion barrier for moisture ($H_2O$) and solvent. In addition, the connecting material 55 acts as an electrical insulator element. In particular, 2C epoxy is proposed as connecting material 55. An adhesive plug connection can advantageously be realized in this way.

As a further advantageous connecting alternative (not illustrated), it is provided that the first half-shell 28 and the second half-shell 29 of a battery cell 2 configured according to the invention are connected to one another by means of a flanged adhesive connection.

Figure 24A:
FIG. 24a shows in a schematic illustration one exemplary embodiment of one manufacturing state of a battery cell configured according to the invention that is to be produced.
Figure 24B:
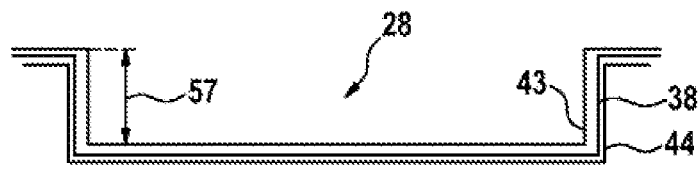
FIG. 24b shows in a schematic illustration one exemplary embodiment of a further manufacturing state of a battery cell configured according to the invention that is to be produced.
Figure 24C:
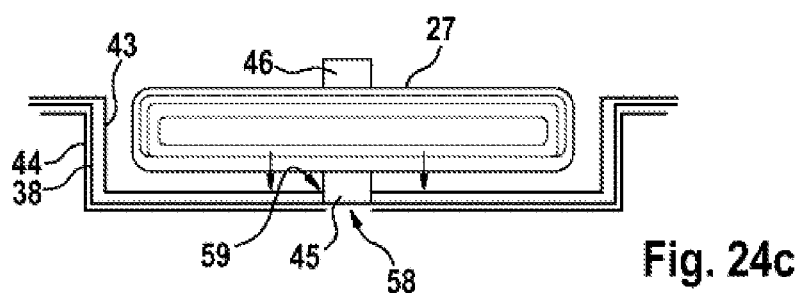
FIG. 24c shows in a schematic illustration one exemplary embodiment of a further manufacturing state of a battery cell configured according to the invention that is to be produced.

One exemplary embodiment of a method according to the invention for producing a battery cell 2 according to the invention is explained more specifically with reference to FIG. 24a, FIG. 24b and FIG. 24c.

Firstly, an electrically nonconductive inner layer 43, preferably a polypropylene layer, and an electrically nonconductive outer layer 44, preferably a polyester or nylon layer, are arranged on a first metallic foil 38, preferably a high-grade steel foil, as illustrated in FIG. 24a. In this case, the layer arrangement preferably has a thickness of between 50 µm and 200 µm.

In a further method step, a first half-shell 28 is shaped from the first metallic foil 38 provided with the inner layer 43 and the outer layer 44 by means of a deep-drawing method, as illustrated in FIG. 24b. In this case, the height of the half-shell 28, as identified by the arrow 57, is preferably between 3.8 mm and 10 mm.

A second half-shell (not illustrated in FIG. 24a to FIG. 24c) is advantageously produced in a corresponding manner, wherein an aluminum foil is preferably used as metal foil therefor.

An electrode arrangement 27, preferably a cell roll ("jelly roll"), is then introduced into the first half-shell 28. In this case, the metal foil 38 of the half-shell 28 is electrically contacted via a first terminal element 45 of the electrode arrangement 27. For this purpose, beforehand the inner layer 43 is provided with a perforation 59 and the outer layer 44 is provided with a perforation 58. The contacting of the electrode arrangement 27 with the metal foil 38 advantageously enables later a contacting via the outer side of the battery cell formed by the half-shell 28.

As further method steps, provision is made for introducing an electrolyte into the half-shells and for tightly sealing the half-shells, for example by adhesive bonding, preferably adhesive bonding as explained in association with FIG. 22 and FIG. 23, or a flanged adhesive connection.

Figure 25:
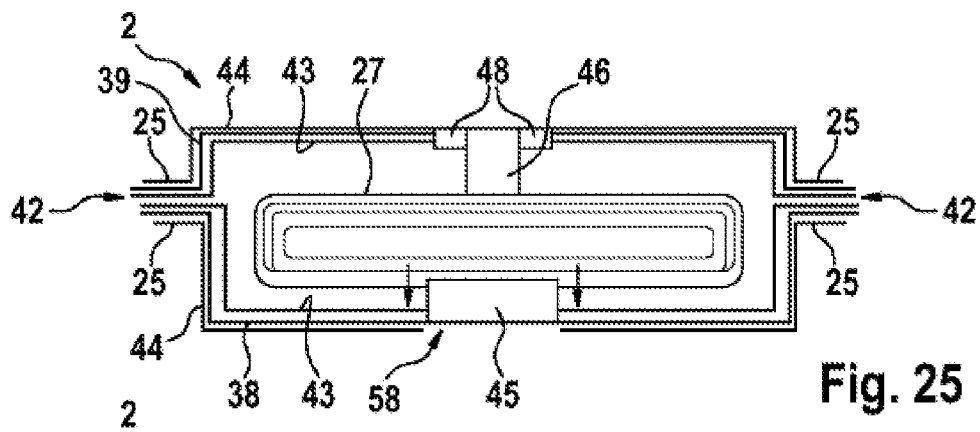
FIG. 25 shows in a schematic illustration a further exemplary embodiment of a battery cell according to the invention for use in an energy storage unit according to the invention.
Figure 26:
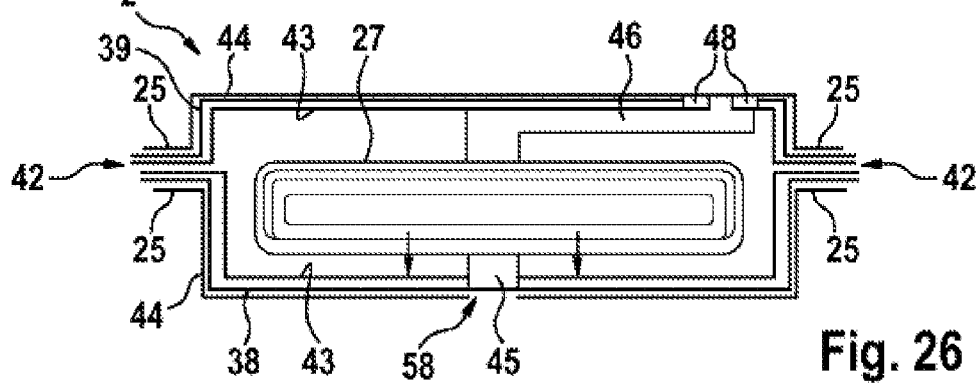
FIG. 26 shows in a schematic illustration a further exemplary embodiment of a battery cell according to the invention for use in an energy storage unit according to the invention.

FIG. 25 and FIG. 26 show advantageous exemplary embodiments of battery cells 2 according to the invention that are formed by means of a method according to the invention. In the case of said battery cells 2, a first electrode of the electrode arrangement 27 is contacted by a first terminal element 45, wherein the first terminal element 45 contacts the first metal foil 38 of the first half-shell 28, as explained in association with FIG. 24c. The second electrode of the electrode arrangement 27 is contacted with a second terminal element 46, wherein the second terminal element 46 penetrates through the second half-shell 29 on the outer side thereof. In this case, the second terminal element 46 is electrically insulated from the second half-shell 29, in particular from the second metal foil 39, by means of the insulating element 48.

In the exemplary embodiment illustrated in FIG. 26, the second terminal element 46 is offset in comparison with the exemplary embodiment illustrated in FIG. 25. By virtue of a different positioning of the first terminal element 45 on one outer side of the battery cell relative to the second terminal element 46 on the other outer side of the battery cell, a protection that prevents inadvertent "incorrect" contacting of battery cells is advantageously provided.

Figure 27:
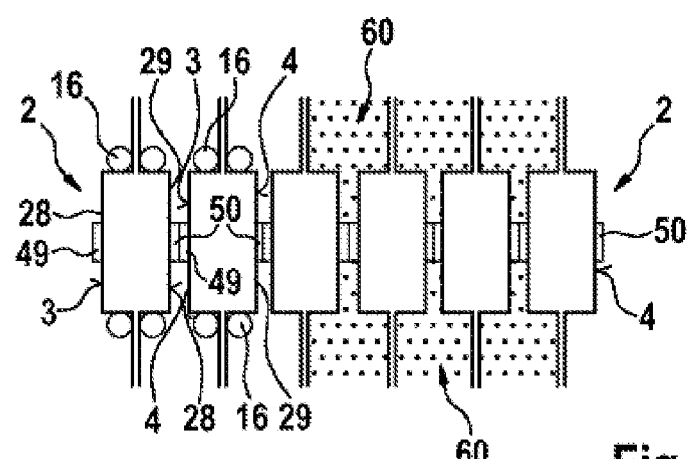
FIG. 27 shows in a schematic illustration a further exemplary embodiment of an interconnection of battery cells configured according to the invention.

An advantageous interconnection in series of such battery cells 2, as illustrated in FIG. 25, is shown in FIG. 27. The battery cells 2 illustrated in FIG. 27 additionally have a cooling device in comparison with the battery cell 2 illustrated in FIG. 25. By way of example, the cooling device in FIG. 27 is realized by cooling channels 16 and an air cooling system 60.

The exemplary embodiments illustrated in the figures and explained in association therewith serve for elucidating the invention and are not restrictive for the latter.

The invention claimed is:

1. An energy storage unit (1) having a plurality of galvanic cells (2), wherein the galvanic cells (2) in each case have a first outer side (3) comprising a first electrode (5) and a second outer side (4) comprising a second electrode (6) and the galvanic cells (2) are electrically interconnected with one another by juxtaposition (9) of the galvanic cells (2) by way of the outer sides (3, 4) via the electrodes (5, 6), characterized in that the energy storage unit (1) comprises a first frame element (7) and a second frame element (8), which are directly or indirectly connected to one another, wherein the first frame element (7) is arranged at one end (10) of the juxtaposition (9) of the galvanic cells (2) and the second frame element (8) is arranged at the other end (11) of the juxtaposition (9) of the galvanic cells (2), the energy storage unit (1) further characterized in that at least one third frame element (12) which at least partly frames at least one galvanic cell (2) of the energy storage unit (1) is arranged between the first frame element (7) and the second frame element (8), wherein the first frame element (7) is connected to the second frame element (8) via the at least one third frame element (12).

2. The energy storage unit (1) as claimed in claim 1, characterized in that the at least one third frame element (12) is arranged in each case between identically sized groups of electrically interconnected galvanic cells (2) of the energy storage unit (1).

3. The energy storage unit (1) as claimed in claim 1, characterized in that the frame elements in each case have at least one fixing element, wherein adjacent frame elements are connected to one another in each case via the at least one fixing element.

4. The energy storage unit (1) as claimed in claim 1, characterized in that the first frame element (7) and/or the second frame element (8) and/or the at least one third frame element (12) in each case have/has at least one contacting element (20), wherein the at least one contacting element (20) contacts at least one galvanic cell (2) of the energy storage unit (1) for detecting at least one parameter of the galvanic cell (2).

5. The energy storage unit (1) as claimed in claim 4, characterized in that the first frame element (7) and/or the second frame element (8) and/or the at least one third frame element (12) in each case have/has at least one connection element (15) which is electrically conductively connected to the at least one contacting element (20), wherein the at least one connection element (15) is connected to a cell monitoring unit (19) and/or is connectable to a cell monitoring unit.

6. The energy storage unit (1) as claimed in claim 1, characterized in that the first frame element (7) and/or the second frame element (8) and/or the at least one third frame element (12) comprise(s) a cell monitoring unit (19).

7. The energy storage unit (1) as claimed in claim 1, characterized in that the first frame element (7) and/or the second frame element (8) and/or the at least one third frame element (12) are/is in each case a cooling device for regulating the temperature of at least one galvanic cell (2) of the energy storage unit (1).

8. The energy storage unit (1) as claimed in claim 1, characterized in that the first frame element (7) and/or the second frame element (8) and/or the at least one third frame element (12) in each case comprise(s) at least one bearing element (23) which projects into an area (22) spanned by the frame element (7, 8, 12) and on which at least one galvanic cell (2) of the energy storage unit (1) bears by way of a bearing region (24) of the galvanic cell (2).

9. The energy storage unit (1) as claimed in claim 1, characterized in that the energy storage unit (1) comprises at least one safety barrier (35) which is arranged between two adjacently arranged galvanic cells (2) of the energy storage unit (1), wherein the safety barrier (35) provides an electrically conductive connection (37) between said galvanic cells (2) and is configured to prevent a thermal chain reaction between said galvanic cells (2).

10. The energy storage unit (1) as claimed in claim 9, characterized in that the at least one safety barrier (35) is furthermore configured as a cooling device for regulating the temperature of the galvanic cells (2) surrounding the safety barrier (35).

11. The energy storage unit (1) as claimed in claim 9, characterized in that the at least one third frame element (12) is configured as the safety barrier (35).

12. A battery cell (2) for use with an energy storage unit (1) as claimed in claim 1, wherein the battery cell (2) has at least one electrode arrangement (27) having at least one cathode (32) and at least one anode (33), said at least one electrode arrangement being surrounded by a first half-shell (28) and by a second half-shell (29), wherein the first half-shell (28) and the second half-shell (29) are connected via a linking region (42) and the first half-shell (28) comprises the first electrode (5) of the battery cell (2) and the second half-shell (29) comprises the second electrode (6) of the battery cell (2).

13. The battery cell (2) as claimed in claim 12, characterized in that the first half-shell (28) comprises a first metallic foil (38) and the second half-shell (29) comprises a second metallic foil (39).

14. The battery cell (2) as claimed in claim 13, characterized in that the battery cell (2) is configured in the manner of a pouch cell, wherein the first metallic foil (38) is shaped to form the first half-shell (28) by means of a deep-drawing method, and the second metallic foil (39) is shaped to form the second half-shell (29) by means of a deep-drawing method.

15. The battery cell (2) as claimed in claim 13, characterized in that the cathode (32) of the at least one electrode arrangement (27) is electrically conductively connected to the first half-shell (28) and the anode (33) of the at least one electrode arrangement (27) is electrically conductively connected to the second half-shell (29), wherein at least one insulator element (30) is arranged between the first half-shell (28) and the second half-shell (29) in the linking region (42)

in such a way that the first half-shell (28) is electrically insulated from the second half-shell (29).

16. The battery cell (2) as claimed in claim 13, characterized in that the electrode arrangement (27) is surrounded by an electrically nonconductive inner layer (43), to which the first half-shell (28) and the second half-shell (29) are adjacent toward the outside.

17. The battery cell (2) as claimed in claim 16, characterized in that the cathode (32) of the at least one electrode arrangement (27) is electrically conductively connected to the first half-shell (28) via a first connecting element (31) and the anode (33) of the at least one electrode arrangement (27) is electrically conductively connected to the second half-shell (29) via a second connecting element (31'), wherein the first connecting element (31) and the second connecting element (31') are led out from the inner layer (43) and the half-shells (28, 29) of the battery cell (2) and the first connecting element (31) electrically conductively contacts the first half-shell (28) on the outer side (3) thereof and the second connecting element (31') electrically conductively contacts the second half-shell (29) on the outer side (4) thereof.

18. The battery cell (2) as claimed in claim 12, characterized in that the battery cell (2) comprises at least one first electrode arrangement (27) having a cathode (32) and an anode (33) and at least one second electrode arrangement (27') having a cathode (32) and an anode (33), wherein the cathode (32) of the first electrode arrangement (27) electrically conductively contacts the first half-shell (28) of the battery cell (2), the anode (33) of the second electrode arrangement (27') electrically conductively contacts the second half-shell (29) of the battery cell (2) and the battery cell (2) comprises in each case between the first electrode arrangement (27) and the second electrode arrangement (27') an electrically conductive separating element (41) which spatially separates the first electrode arrangement (27) from the second electrode arrangement (27') and which is electrically conductively contacted by the anode (33) of the first electrode arrangement (27) and the cathode (32) of the second electrode arrangement (27').

19. The battery cell (2) as claimed in claim 12, characterized in that at least one cooling device for regulating the temperature of the battery cell (2) is arranged between the first half-shell (28) and the second half-shell (29) in the linking region (42).

20. The battery cell (2) as claimed in claim 12, characterized in that the first half-shell (28) and the second half-shell (29) have in the linking region (42) in each case a border (25) tapering off in a flat fashion, wherein the border (25) of the first half-shell (28) together with the border (25) of the second half-shell (29) are electrically non-conductively connected to one another.

21. The battery cell (2) as claimed in claim 12, characterized in that the first half-shell (28) and the second half-shell (29) are connected to one another by at least one of a flanged adhesive connection and an adhesive plug connection.

22. The battery cell (2) as claimed in claim 12, characterized in that the cathode (32) is contacted with a first terminal element (45), wherein the first terminal element (45) penetrates through the first half-shell (28) on the outer side (3) thereof, and wherein the first terminal element (45) is electrically insulated from the first half-shell (28), and/or the anode (33) is contacted with a second terminal element (46), wherein the second terminal element (46) penetrates through the second half-shell (29) on the outer side (4) thereof, and wherein the second terminal element (46) is electrically insulated from the second half-shell (29).

23. A method for producing a battery cell (2) as claimed in claim 12, wherein
a first half-shell (28) having a first outer side (3) is shaped from a first metallic foil (38),
a second half-shell (29) having a second outer side (4) and configured in a manner corresponding to the first half-shell (28) is shaped from a second metallic foil (29) in such a way that at least one electrode arrangement (27) having a cathode (32) and an anode (33) can be enclosed by the first half-shell (28) and the second half-shell (29),
the cathode (32) and the anode (33) of an electrode arrangement are electrically conductively contacted in such a way that a contacting of the cathode (32) via the first outer side (3) of the first half-shell (28) is made possible and a contacting of the anode (33) via the second outer side (4) of the second half-shell (29) is made possible, and
the first half-shell (28) and the second half-shell (29) are electrically non-conductively connected to one another.

24. The method as claimed in claim 12, characterized in that on the first metallic foil (38) an electrically nonconductive inner layer (43) is arranged and/or an electrically nonconductive outer layer (44) is arranged, in such a way that the inner layer (43) is arranged at least partly on the inner side of the first half-shell (28) and the outer layer (44) is arranged at least partly on the outer side (3) of the first half-shell (28), and/or on the second metallic foil (39) an electrically nonconductive inner layer (43) is arranged and/or an electrically nonconductive outer layer (44) is arranged, in such a way that the inner layer (43) is arranged at least partly on the inner side of the second half-shell (29) and the outer layer (44) is arranged at least partly on the outer side (4) of the second half-shell (29).

* * * * *